(12) United States Patent
Renz et al.

(10) Patent No.: US 6,268,415 B1
(45) Date of Patent: Jul. 31, 2001

(54) STABILIZED ADHESIVE COMPOSITIONS CONTAINING HIGHLY SOLUBLE, PHOTOSTABLE BENZOTRIAZOLE UV ABSORBERS AND LAMINATED ARTICLES DERIVED THEREFROM

(75) Inventors: Walter Renz, Brookfield, CT (US); Joseph Suhadolnik, Yorktown Heights, NY (US); Mervin Gale Wood, Jr., Poughquag, NY (US); Ramanathan Ravichandran, Nanuet, NY (US); Revathi Iyengar, Courtland Manor, NY (US); Luther A. R. Hall, Woodcliff Lake, NJ (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/303,582

(22) Filed: May 3, 1999

(51) Int. Cl.$^7$ .................................................. C08K 5/34
(52) U.S. Cl. ......................... 524/91; 524/110; 524/300; 524/487; 428/423.1; 428/480; 428/500
(58) Field of Search ..................... 524/91, 110, 300, 524/487; 428/423.1, 480, 500

(56) References Cited

U.S. PATENT DOCUMENTS

| | | | |
|---|---|---|---|
| 3,004,896 | 10/1961 | Heller et al. | 167/90 |
| 3,055,896 | 9/1962 | Boyle et al. | 260/249.5 |
| 3,072,585 | 1/1963 | Milionis et al. | 260/22 |
| 3,074,910 | 1/1963 | Dickson, Jr. | 260/45.75 |
| 3,189,615 | 6/1965 | Heller et al. | 260/308 |
| 3,230,194 | 1/1966 | Boyle | 260/45.8 |
| 3,290,203 | 12/1966 | Antonson et al. | 161/4 |
| 3,681,179 | 8/1972 | Theissen | 161/4 |
| 3,776,805 | 12/1973 | Hansen | 161/2 |
| 4,095,013 | 6/1978 | Burger | 428/522 |
| 4,127,586 | 11/1978 | Rody et al. | 260/308 |
| 4,226,763 | 10/1980 | Dexter et al. | 260/45.8 |
| 4,278,589 | 7/1981 | Dexter et al. | 260/45.8 |
| 4,315,848 | 2/1982 | Dexter et al. | 260/45.8 |
| 4,383,863 | 5/1983 | Dexter et al. | 106/125 |
| 4,645,714 | 2/1987 | Roche et al. | 428/458 |
| 4,675,352 | 6/1987 | Winter et al. | 524/91 |
| 4,681,905 | 7/1987 | Kubota et al. | 524/91 |
| 4,853,471 | 8/1989 | Rody et al. | 548/261 |
| 4,871,784 | 10/1989 | Otonari et al. | 521/138 |
| 5,095,062 | * 3/1992 | Winter et al. | 524/91 |
| 5,217,794 | 6/1993 | Schrenk | 428/220 |
| 5,239,406 | 8/1993 | Lynam | 359/275 |
| 5,280,124 | 1/1994 | Winter et al. | 548/259 |
| 5,372,889 | 12/1994 | Harisiades et al. | 428/429 |
| 5,387,458 | 2/1995 | Pavelka et al. | 428/141 |
| 5,426,204 | 6/1995 | Harisiades et al. | 556/429 |
| 5,436,349 | 7/1995 | Winter et al. | 548/259 |
| 5,523,877 | 6/1996 | Lynam | 359/275 |
| 5,554,760 | 9/1996 | Winter et al. | 548/260 |
| 5,563,242 | 10/1996 | Winter et al. | 524/91 |
| 5,564,843 | 10/1996 | Kawaguchi | 400/208 |
| 5,574,166 | 11/1996 | Winter et al. | 548/260 |
| 5,607,987 | 3/1997 | Winter et al. | 524/91 |
| 5,618,626 | 4/1997 | Hagashima et al. | 428/429 |
| 5,643,676 | 7/1997 | Dobashi et al. | 428/411.1 |
| 5,770,114 | 6/1998 | Byker et al. | 252/583 |

FOREIGN PATENT DOCUMENTS

| | | |
|---|---|---|
| 0355962 | 2/1990 | (EP) . |
| 0698637 | 2/1996 | (EP) . |
| 0752612 | 1/1997 | (EP) . |
| 2012668 | 8/1979 | (GB) . |
| 2051672 | 1/1981 | (GB) . |
| 95003217 | 1/1995 | (JP) . |
| 96143831 | 6/1996 | (JP) . |
| 92/01557 | 2/1992 | (WO) . |
| 97/32225 | 9/1997 | (WO) . |
| 97/42261 | 11/1997 | (WO) . |

OTHER PUBLICATIONS

A.D. DeBellis, et al., Proceedings of "Service Life Prediction Methodology and Metrologies", Symposium, Nov. 14–19, 1999, Monterey, CA.
Anthony D. DeBellis, et al., Journal of Physical Organic Chemistry, vol. 10, 107–112 (1997).
J.C. Salamone, ed. "Polymeric Materials Encyclopedia", vol. 11, 1996, p. 8241.
Derwent Abstract 92–295232/36 for JP 04202032 (Jul. 1992).
Patent Abstracts of Japan 11116910, Apr. 1999.
Patent Abstracts of Japan 02175782, Jul. 1990.
Patent Abstracts of Japan 06299132, Oct. 1994.
Patent Abstracts of Japan 08048954, Feb. 1996.
Patent Abstracts of Japan 05092514, Apr. 1993.

* cited by examiner

*Primary Examiner*—Kriellion Sanders
(74) *Attorney, Agent, or Firm*—Luther A. R. Hall

(57) ABSTRACT

Adhesive compositions are rendered stable against degradation caused by ultraviolet light through the incorporation of a highly soluble, photostable benzotriazole UV absorber which is substituted in the ortho position of the hydroxyphenyl ring by α-cumyl or phenyl. Examples of such compounds are 2-(2-hydroxy-3-α-cumyl-5-tert-octylphenyl)-2H-benzotriazole, 5-chloro-2-(2-hydroxy-3-α-cumyl-5-tert-octylphenyl)-2H-benzotriazole, 5-fluoro-2-(2-hydroxy-3-α-cumyl-5-tert-octylphenyl)-2H-benzotriazole, 2-(2-hydroxy-3-α-cumyl-5-tert-butylphenyl)-2H-benzotriazole, 5-chloro-2-(2-hydroxy-3-α-cumyl-5-tert-butylphenyl)-2H-benzotriazole and 5-fluoro-2-(2-hydroxy-3-α-cumyl-5-tert-butylphenyl)-2H-benzotriazole. These compounds exhibit excellent photostability and are highly soluble in adhesive formulations. The laminated articles derived from these compositions include, for example, solar control films, films and glazings, UV absorbing glasses and glass coatings, windscreens, retroreflective sheetings and signs, solar reflectors, optical films and the like.

46 Claims, No Drawings

STABILIZED ADHESIVE COMPOSITIONS CONTAINING HIGHLY SOLUBLE, PHOTOSTABLE BENZOTRIAZOLE UV ABSORBERS AND LAMINATED ARTICLES DERIVED THEREFROM

This invention pertains to stabilized adhesive compositions containing an effective amount of a benzotriazole substituted in the ortho position of the hydroxyphenyl ring by α-cumyl or phenyl, such as 2-(2-hydroxy-3-α-cumyl-5-tert-octylphenyl)-2H-benzotriazole having enhanced solubility and durability.

BACKGROUND OF THE INVENTION

Adhesives are made up of various components such as polymers, tackifiers, waxes and oils. Adhesive formulations based on these ingredients are susceptible to degradation. The consequences of degradation are discoloration, loss of elongation, loss of tensile strength, loss of tack and change in viscosity, molecular weight and molecular weight distribution. Degradation can be caused by prolonged exposure to sunlight. Sunlight contains invisible ultraviolet (UV) radiation with wavelengths between 290 and 400 nm. This radiation is responsible for the initiation of photodegradation.

Absorption of UV light by chromophores present in the adhesive formulation transforms the chromophores into their excited states which can undergo further undesired reactions. Some polymers contain strongly absorbing chromophores as a major part of their structures. Other polymers contain unintentional impurities such as ketones and hydroperoxide moieties and catalyst residues which act as chromophores. Absorption of UV radiation by these chromophores eventually results in bond cleavage, chain scission and/or crosslinking reactions.

Photostabilization of adhesives can be achieved by the addition of UV absorbers which convert the absorbed energy into harmless heat. An ideal UV absorber should be extremely photostable and have strong absorption over the UV range from 290 to 400 nm, but particularly the range of 350 to 400 nm. Classes of UV absorbers include the salicylates, cyanoacrylates, malonates, oxanilides, benzophenones, s-triazines and benzotriazoles.

Salicylates, cyanoacrylates, malonates and oxanilides absorb UV light primarily at the lower wavelengths of the UV range. These compounds have little to no absorption in the range of 350 to 400 nm which make them unsuitable for the instant applications. Benzophenones absorb over the lower half of the UV range, and they tend to be prone to yellowing upon light exposure due to photodegradation. Recently, it has been shown photochemically that benzophenones decompose prematurely in ethylene-vinyl acetate encapsulants which lead to the production of polyenic chromophores. This color generation from light yellow to brown is not only highly undesirable and unsightly in adhesive systems, but also can results in a loss of adhesive properties. By contrast, selected benzotriazole UV absorbers are particularly useful because of their increased photostability.

Some polymers such as polycarbonates, polyesters and aromatic polyurethanes contain strongly absorbing chromophores as a major and integral part of their structures. Poly(ethylene terephthalate) (PET) and poly(ethylene 2,6-naphthalenedicarboxylate) (PEN) are particular examples the latter of which absorbs into the red UV region and especially need red-shifted benzotriazoles for UV protection. U.S. Pat. No. 5,294,473 and WO 98/34981 teach the use of coatings containing UV absorbers including some benzotriazoles in stabilizing PEN films. Adding an adhesive UV screening layer containing the benzotriazoles, especially those described in the instant invention, further protects such polymers in multilayered constructions and articles.

The description, preparation and uses of the 2H-benzotriazole UV absorbers are described in U.S. Pat. Nos. 3,004,896; 3,055,896; 3,072,585; 3,074,910; 3,189,615; 3,230,194; 4,127,586; 4,226,763; 4,278,589; 4,315,848; 4,383,863; 4,675,352; 4,681,905 and 4,853,471.

Selected benzotriazoles with just hydrogen or halogen at the 5-position of the benzo ring are photostable and soluble in adhesive formulations. One such benzotriazole is 2-(2-hydroxy-3-α-cumyl-5-tert-octylphenyl)-2H-benzotriazole as described in U.S. Pat. Nos. 5,554,760; 5,563,242; 5,574,166 and 5,607,987. These patents are incorporated herein by reference. While the absorbance of this benzotriazole is not red-shifted toward longer UV wavelengths, it is very photostable and is amazingly soluble in adhesives making it especially well-suited for the instant applications.

It is known in the art that the concomitant use of a hindered amine light stabilizer with a UV absorber such as a benzotriazole provides excellent stabilization in many polymer compositions as summarized by G. Berner and M. Rembold, "New Light Stabilizers for High Solids Coatings", Organic Coatings and Science and Technology, Vol. 6, Dekkar, New York, pp 55–85.

The effect of UV light on laminated articles that are exposed to the sun or other sources of UV light are of great concern to the manufacturers of such articles. Over time, constant or repeated exposure to UV light can result in dye and/or pigment fade for dyes and/or pigments used in such articles and in the degradation or breakdown of the adhesives, polymers or other materials used in the construction of the articles. The aforementioned fading and degradation shorten the useful life of the articles in question, making protection from UV light exposure an issue of great importance to the manufacturers of such articles.

Molecules known as UV absorbers are generally known in the art. However, due to the differences discussed above between the various UV absorber classes, it is the benzotriazoles and articles containing them which will be discussed here. Due to the incompatibility and low solubility of certain benzotriazoles, a need exists for a benzotriazole that is highly soluble and which is very photostable.

In addition, articles which incorporate the selected benzotriazoles of the instant invention are useful in protecting interior structures, textiles and fabrics from UV induced photodegradation such as in automotive applications.

International application WO 97/32225 describes the use of PEN films having reflective and polarizing elements for use as optical films.

U.S. Pat. No. 5,770,114 discloses stabilized compositions containing soluble benzotriazoles that are used in electrochromic devices. This patent discloses that 2-(2-hydroxy-5-methylphenyl)-2H-benzotriazole is effective in stabilizing such electrochromic devices against degradation from UV radiation, but that it is not soluble enough in aprotic solvents, e.g. propylene carbonate, to provide suitable protection for electrochromic devices for very long periods of time. This indicates that the acceptable benzotriazole UV absorbers must also exhibit excellent solubility in substrates and solvents in order to be acceptable.

Articles which would benefit from the incorporation of the instant, highly soluble and photostable benzotriazole include, but are not limited to:

(a) Retroreflective Sheets and Signs and Conformable Marketing Sheets as seen in WO 97/42261; and U.S. Pat. No. 5,387,458 which is incorporated herein by reference;

(b) Solar Control Films of Various Construction as seen in British 2,012,668; European 355,962; and U.S. Pat. Nos. 3,290,203; 3,681,179; 3,776,805 and 4,095,013 which are incorporated herein by reference;

(c) Corrosion Resistant Silver Mirrors and Solar Reflectors as seen in U.S. Pat. No. 4,645,714 which is incorporated herein by reference;

(d) Reflective Print Labels as seen in U.S. Pat. No. 5,564,843 which is incorporated herein by reference;

(e) UV Absorbing Glasses and Glass Coatings as seen in U.S. Pat. Nos. 5,372,889; 5,426,204; 5,683,804 and 5,618,626 which are incorporated herein by reference;

(f) Electrochromic Devices as seen in European 752,612 A1; and U.S. Pat. Nos. 5,239,406; 5,523,877 and 5,770,114 which are incorporated herein by reference;

(g) Films/Glazings as seen in WO 92/01557; Japanese Nos. 75-33286; 93-143668; 95-3217 and 96-143831; and U.S. Pat. No. 5,643,676 which is incorporated herein by reference;

(h) Windscreens and Intermediate Layers as seen in Japanese Nos. 80-40018; 90-192118; 90-335037; 90-335038; 92-110128 and 94-127591; and (i) Optical Films as seen in WO 97/32225; and U.S. Pat. Nos. 4,871,784 and 5,217,794 which are incorporated herein by reference.

DETAILED DISCLOSURE

The general embodiment of the instant invention is to a stabilized adhesive composition, suitable for use as an adhesive layer in a laminated article or multilayer construction, which comprises (a) an adhesive; and (b) an effective stabilizing amount of a highly soluble and photos table benzotriazole which is 2-(2-hydroxy-3-α-cumyl-5-tert-octylphenyl)-2H-benzotriazole, 5-chloro-2-(2-hydroxy-3-α-cumyl-5-tert-octylphenyl)-2H-benzotriazole, 5-fluoro-2-(2-hydroxy-3-α-cumyl-5-tert-octylphenyl)-2H-benzotriazole, 2-(2-hydroxy-3-α-cumyl-5-tert-butylphenyl)-2H-benzotriazole, 5-chloro-2-(2-hydroxy-3-α-cumyl-5-tert-butylphenyl)-2H-benzotriazole or 5-fluoro-2-(2-hydroxy-3-α-cumyl-5-tert-butylphenyl)-2H-benzotriazole;

with the proviso that the benzotriazole in component (b) exhibits enhanced durability and low loss of absorbance when exposed to actinic radiation as witnessed by an absorbance loss of less than 0.5 absorbance units after exposure for 893 hours or less than 0.8 absorbance units after exposure for 1338 hours in a Xenon Arc Weather-Ometer.

More particularly, the adhesive of component (a) is selected from the group consisting of the pressure sensitive adhesives, the rubber-based adhesives, the solvent or emulsion based adhesives, the hot melt adhesives and natural-product based adhesives. These adhesives are selected from the group consisting of the polyurethanes, polyacrylics, epoxys, phenolics, polyimides, poly(vinyl butyral), polycyanoacrylates, polyacrylates, ethylene/acrylic acid copolymers and their salts (ionomers), silicon polymers, poly(ethylene/vinyl acetate), atatic polypropylene, styrene-diene copolymers, polyamides, hydroxyl-terminated polybutadiene, polychloroprene, poly(vinyl acetate), carboxylated styrene/butadiene copolymers and poly(vinyl alcohol).

It is also contemplated that the instant benzotriazole 2-(2-hydroxy-3-α-cumyl-5-tert-octylphenyl)-2H-benzotriazole or 2-(2-hydroxy-3-α-cumyl-5-tert-butylphenyl)-2H-benzotriazole may be advantageously combined with a minor amount of a red-shifted benzotriazole to obtain an increase in absorbance in the 350 nm to 400 nm ultraviolet range. An example of such a mixture would be a combination of highly soluble, photostable 2-(2-hydroxy-3-α-cumyl-5-tert-octylphenyl)-2H-benzotriazole with red-shifted, but less soluble 5-chloro-2-(2-hydroxy-3,5-di-tert-butylphenyl)-2H-benzotriazole or 5-chloro-2-(2-hydroxy-3-tert-butyl-5-methylphenyl)-2H-benzotriazole. The other four benzotriazoles 5-chloro-2-(2-hydroxy-3-α-cumyl-5-tert-octylphenyl)-2H-benzotriazole, 5-fluoro-2-(2-hydroxy-3-α-cumyl-5-tert-octylphenyl)-2H-benzotriazole, 5-chloro-2-(2-hydroxy-3-α-cumyl-5-tert-butylphenyl)-2H-benzotriazole and 5-fluoro-2-(2-hydroxy-3-α-cumyl-5-tert-butylphenyl)-2H-benzotriazole are already red-shifted. The red-shifted benzotriazoles are described in U.S. Pat. Nos. 5,280,124 and 5,436,349, which are incorporated herein by reference, and in copending patent application Ser. Nos. 08/961,127 and 09/234,880.

The instant invention also pertains to a stabilized adhesive composition, suitable for use as an adhesive layer in a laminated article or multilayer construction, which comprises (a) an adhesive; and (b) an effective stabilizing amount of a combination of (1) a highly photostable benzotriazole which is 2-(2-hydroxy-3,5-di-α-cumylphenyl)-2H-benzotriazole or a red-shifted benzotriazole which is 5-chloro-2-(2-hydroxy-3,5-di-tert-butylphenyl)-2H-benzotriazole or 5-chloro-2-(2-hydroxy-3-tert-butyl-5-methylphenyl)-2H-benzotriazole each of which has relatively low solubility in some adhesives; and (2) a solubilizing amount of a second benzotriazole having high solubility in said adhesives and selected from the group consisting of 2-(2-hydroxy-3,5-di-tert-butylphenyl)-2H-benzotriazole, 2-(2-hydroxy-3,5-di-tert-amylphenyl)-2H-benzotriazole, 2-(2-hydroxy-5-tert-octylphenyl)-2H-benzotriazole, 2-(2-hydroxy-3-sec-butyl-5-tert-butylphenyl)-2H-benzotriazole, 2-(2-hydroxy-3-α-cumyl-5-tert-octylphenyl)-2H-benzotriazole or 2-(2-hydroxy-3-α-cumyl-5-tert-butylphenyl)-2H-benzotriazole;

with the proviso that the benzotriazole in component (b) exhibits enhanced durability and low loss of absorbance when exposed to actinic radiation as witnessed by an absorbance loss of less than 0.5 absorbance units after exposure for 893 hours or less than 0.8 absorbance units after exposure for 1338 hours in a Xenon Arc Weather-Ometer.

It is contemplated that such a combination of benzotriazoles would provide sufficient solubility to be practicable in these adhesive compositions for laminates and/or multilayer constructions to provide adequate photostability and/or red-shifting to achieve superior end-use performance.

The instant invention is also to a stabilized adhesive composition, suitable for use as an adhesive layer in a laminated article or multilayer construction, which comprises (a) an adhesive; and (b) an effective stabilizing amount of a combination of (i) a highly soluble and photostable benzotriazole which is 2-(2-hydroxy-3-α-cumyl-5-tert-octylphenyl)-2H-benzotriazole, 5-chloro-2-(2- hydroxy-3-α-cumyl-5-tert-octylphenyl)-2H-benzotriazole, 5-fluoro-2-(2-hydroxy-3-α-cumyl-5-tert-octylphenyl)-2H-benzotriazole, 2-(2-hydroxy-3-α-cumyl-5-tert-butylphenyl)-2H-benzotriazole, 5-chloro-2-(2-hydroxy-3-α-cumyl-5-tert-butylphenyl)-2H-benzotriazole or 5-fluoro-2-(2-hydroxy-3-α-cumyl-5-tert-butylphenyl)-2H-benzotriazole; or the highly photostable benzotriazole which is 2-(2-hydroxy-3,5-di-α-cumylphenyl)-2H-benzotriazole; and (ii) a highly soluble, red-shifted, photostable benzotriazole which is a compound of formula I, II or III

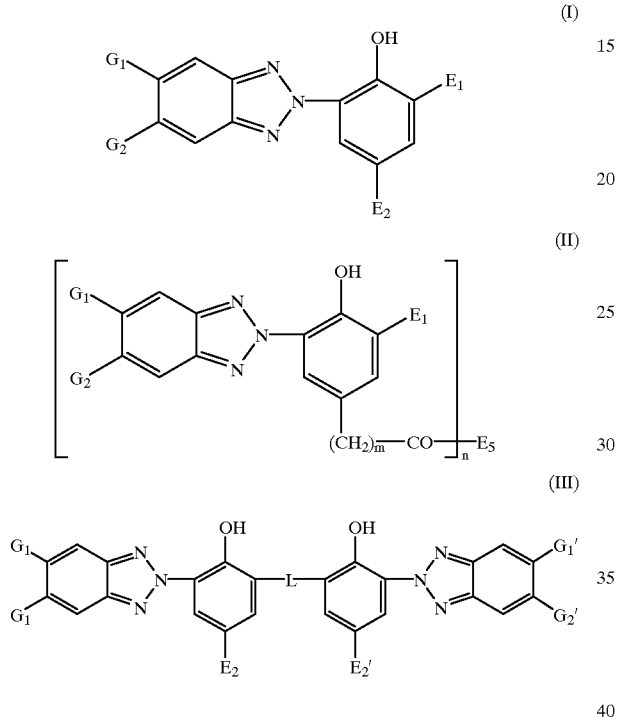

wherein
$G_1$ and $G_1'$ are independently hydrogen or halogen,
$G_2$ and $G_2'$ are independently halogen, nitro, cyano, perfluoroalkyl of 1 to 12 carbon atoms, —COOG$_3$, —P(O)(C$_6$H$_5$)$_2$, —CO—G$_3$, —CO—NH—G$_3$, —CO—N(G$_3$)$_2$, —N(G$_3$)—CO—G$_3$, E$_3$SO— or E$_3$SO$_2$—; or $G_2'$ is also hydrogen,
$G_3$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms,
$E_1$ is hydrogen, straight or branched chain alkyl of 1 to 24 carbon atoms, straight or branched chain alkenyl of 2 to 24 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or $E_1$ is alkyl of 1 to 24 carbon atoms substituted by one or two hydroxy groups,
$E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by one to three alkyl of 1 to 4 carbon atoms; or $E_2$ and $E_2'$ are independently said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where E$_4$ is straight or branched chain alkyl of 1 to 24 carbon atoms; or said alkyl or said alkenyl interrupted by one or more —O—, —NH— or —NE$_4$— groups or mixtures thereof and which can be unsubstituted or substituted by one or more —OH, —OE$_4$ or —NH$_2$ groups or mixtures thereof;

n is 1 or 2,
when n is 1, E$_5$ is OE$_6$ or NE$_7$E$_8$, or
E$_5$ is —PO(OE$_{12}$)$_2$, —OSi(E$_{11}$)$_3$ or —OCO—E$_{11}$, or straight or branched chain C$_1$–C$_{24}$alkyl which is interrupted by —O—, —S— or —NE$_{11}$ and which can be unsubstituted or substituted by —OH or —OCO—E$_{11}$, C$_5$–C$_{12}$ cycloalkyl which is unsubstituted or substituted by —OH, straight chain or branched C$_2$–C$_{18}$alkenyl which is unsubstituted or substituted by —OH, C$_7$–C$_{15}$aralkyl, —CH$_2$—CHOH—E$_{13}$ or glycidyl,
E$_6$ is hydrogen, straight or branched chain C$_1$–C$_{24}$alkyl which is unsubstituted or substituted by one or more OH, OE$_4$ or NH$_2$ groups, or —OE$_6$ is —(OCH$_2$CH$_2$)$_w$OH or —(OCH$_2$CH$_2$)$_w$OE$_{21}$ where w is 1 to 12 and E$_{21}$ is alkyl of 1 to 12 carbon atoms,
E$_7$ and E$_8$ are independently hydrogen, alkyl of 1 to 18 carbon atoms, straight or branched chain C$_3$–C$_{18}$alkyl which is interrupted by —O—, —S— or —NE$_{11}$—, C$_5$–C$_{12}$cycloalkyl, C$_6$–C$_{14}$aryl or C$_1$–C$_3$hydroxylalkyl, or E$_7$ and E$_8$ together with the N atom are a pyrrolidine, piperidine, piperazine or morpholine ring,
E$_5$ is —X—(Z)$_p$—Y—E$_{15}$
wherein
X is —O— or —N(E$_{16}$)—,
Y is —O— or —N(E$_{17}$)—,
Z is C$_2$–C$_{12}$-alkylene, C$_4$–C$_{12}$-alkylene interrupted by one to three nitrogen atoms, oxygen atoms or a mixture thereof, or is C$_3$–C$_{12}$-alkylene, butenylene, butynylene, cyclohexylene or phenylene, each substituted by a hydroxyl group,
m is zero, 1 or 2,
p is 1, or p is also zero when X and Y are —N(E$_{16}$)— and —N(E$_{17}$)—, respectively,
E$_{15}$ is a group —CO—C(E$_{18}$)=C(H)E$_{19}$ or, when Y is —N(E$_{17}$)—, forms together with E$_{17}$ a group —CO—CH=CH—CO—, wherein E$_{18}$ is hydrogen or methyl, and E$_{19}$ is hydrogen, methyl or —CO—X—E$_{20}$, wherein E$_{20}$ is hydrogen, C$_1$–C$_{12}$-alkyl or a group of the formula

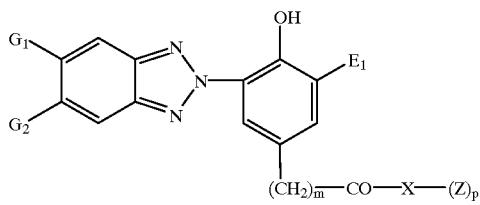

wherein the symbols $E_1$, $G_2$, X, Z, m and p have the meanings defined above, and $E_{16}$ and $E_{17}$ independently of one another are hydrogen, $C_1$–$C_{12}$-alkyl, $C_3$–$C_{12}$-alkyl interrupted by 1 to 3 oxygen atoms, or is cyclohexyl or $C_7$–$C_{15}$aralkyl, and $E_{16}$ together with $E_{17}$ in the case where Z is ethylene, also forms ethylene, when n is 2, $E_5$ is one of divalent radicals —O—$E_9$—O— or —N($E_{11}$)—$E_{10}$—N($E_{11}$)—, $E_9$ is $C_2$–$C_8$alkylene, $C_4$–$C_8$alkenylene, $C_4$alkynylene, cyclohexylene, straight or branched chain $C_4$–$C_{10}$alkylene which is interrupted by —O— or by —$CH_2$—CHOH—$CH_2$—O—$E_{14}$—O—$CH_2$—CHOH—$CH_2$—, $E_{10}$ being straight or branched chain $C_2$–$C_{12}$alkylene which may be interrupted by —O—, cyclohexylene, or

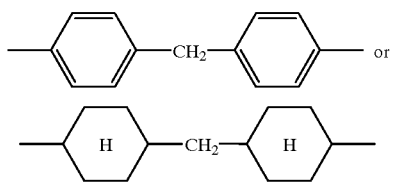

or $E_{10}$ and $E_{11}$ with the two nitrogen atoms form a piperazine ring, $E_{14}$ is straight or branched chain $C_2$–$C_8$alkylene, straight or branched chain $C_4$–$C_{10}$alkylene which is interrupted by —O—, cycloalkylene, arylene or

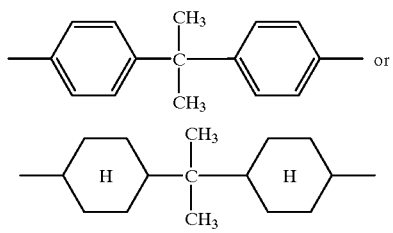

where $E_7$ and $E_8$ are independently hydrogen, alkyl of 1 to 18 carbon atoms or $E_7$ and $E_8$ together are alkylene of 4 to 6 carbon atoms, 3-oxapentamethylene, 3-iminopentamethylene or 3-methyliminopentamethylene, $E_{11}$ is hydrogen, straight or branched chain $C_1$–$C_{18}$alkyl, $C_5$–$C_{12}$cycloalkyl, straight or branched chain $C_2$–$C_{18}$alkenyl, $C_6$–$C_{14}$aryl or $C_7$–$C_{15}$aralkyl, $E_{12}$ is straight or branched chain $C_1$–$C_{18}$alkyl, straight or branched chain $C_3$–$C_{18}$alkenyl, $C_5$–$C_{10}$cycloalkyl, $C_6$–$C_{16}$aryl or $C_7$–$C_{15}$aralkyl, $E_{13}$ is H, straight chain or branched $C_1$–$C_{18}$alkyl which is substituted by —PO(OR$_{12}$)$_2$, phenyl which is unsubstituted or substituted by OH, $C_7$–$C_{15}$aralkyl or —$CH_2$OE$_{12}$, $E_3$ is alkyl of 1 to 20 carbon atoms, hydroxyalkyl of 2 to 20 carbon atoms, alkyl substituted by alkoxycarbonyl of 2 to 9 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms, and L is alkylene of 1 to 12 carbon atoms, alkylidene of 2 to 12 carbon atoms, benzylidene, p-xylylene, α,α,α',α'-tetramethyl-m-xylylene or cycloalkylidene; and with the proviso that formula I does not represent 5-ethylsulfonyl-2-(2-hydroxy-5-methylphenyl)-2H-benzotriazole; 5-fluoro-2-(2-hydroxy-3-α-cumyl-5-tert-octylphenyl)-2H-benzotriazole; 5-fluoro-2-(2-hydroxy-3-α-cumyl-5-tert-butylphenyl)-2H-benzotriazole; 5-chloro-2-(2-hydroxy-3-α-cumyl-5-tert-octylphenyl)-2H- benzotriazole; 5-chloro-2-(2-hydroxy-3-α-cumyl-5-tert-octylphenyl)-2H-benzotriazole; 5-chloro-2-(2-hydroxy-3,5-di-tert-butylphenyl)-2H-benzotriazole; or 5-chloro-2-(2-hydroxy-3-tert-butyl-5-methylphenyl)-2H-benzotriazole; and with the further proviso that the benzotriazole in component (b) exhibits enhanced durability and low loss of absorbance when exposed to actinic radiation as witnessed by an absorbance loss of less than 0.5 absorbance units after exposure for 893 hours or less than 0.8 absorbance units after exposure for 1338 hours in a Xenon Arc Weather-Ometer.

The effective amount of the UV absorber of component (b) is 0.1 to 20% by weight based on the adhesive composition.

The effective amount of the UV absorber of (1) plus (2) in component (b) is 0.1 to 20% by weight based on the adhesive composition.

The effective amount of the UV absorber of (i) plus (ii) in component (b) is 0.1 to 20% by weight based on the adhesive composition.

When a combination of (1) a photostable, but less soluble benzotriazole which is 2-(2-hydroxy-3,5-di-α-cumylphenyl)-2H-benzotriazole or a red-shifted benzotriazole which is 5-chloro-2-(2-hydroxy-3,5-di-tert-butylphenyl)-2H-benzotriazole or 5-chloro-2-(2-hydroxy-3-tert-butyl-5-methylphenyl)-2H-benzotriazole, each of which has relatively low solubility in some adhesives; and (2) a solubilizing amount of a second benzotriazole having high solubility in said adhesives and selected from the group consisting of 2-(2-hydroxy-3,5-di-tert-butylphenyl)-2H-benzotriazole, 2-(2-hydroxy-3,5-di-tert-amylphenyl)-2H-benzotriazole, 2-(2-hydroxy-5-tert-octylphenyl)-2H-benzotriazole, 2-(2-hydroxy-3-sec-butyl-5-tert-butylphenyl)-2H-benzotriazole, 2-(2-hydroxy-3-α-cumyl-5-tert-octylphenyl)-2H-benzotriazole or 2-(2-hydroxy-3-α-cumyl-5-tert-butylphenyl)-2H-benzotriazole; the relative amount of (1) to (2) by weight is from 75:25 to 25:75; preferably 50:50.

When a combination of (i) a highly soluble and photostable benzotriazole which is 2-(2-hydroxy-3-α-cumyl-5-tert-octylphenyl)-2H-benzotriazole, 5-chloro-2-(2-hydroxy-3-α-cumyl-5-tert-octylphenyl)-2H-benzotriazole, 5-fluoro-2-(2-hydroxy-3-α-cumyl-5-tert-octylphenyl)-2H-benzotriazole, 2-(2-hydroxy-3-α-cumyl-5-tertbutylphenyl)-2H-benzotriazole, 5-chloro-2-(2-hydroxy-3-α-cumyl-5-tert-butylphenyl)-2H-benzotriazole or 5-fluoro-2-(2-hydroxy-3-(α-cumyl-5-tert-butylphenyl)-2H-benzotriazole; or highly photostable 2-(2-hydroxy-3,5-di-α-cumylphenyl)-2H-benzotriazole; and of (ii) a highly soluble, photostable benzotriazole which is a compound of formula I, II or III is used, the relative amount by weight of (i) to (ii) is from 99:1 to 1:99; preferably 90:10 to 25:75; most preferably 50:50.

Preferably, the benzotriazole of component (ii) is a compound which is (a) 5-trifluoromethyl-2-(2-hydroxy-3-α-cumyl-5-tert-octylphenyl)-2H-benzotriazole;

(b) 5-trifluoromethyl-2-(2-hydroxy-5-tert-octylphenyl)-2H-benzotriazole;

(c) 5-trifluoromethyl-2-(2-hydroxy-3,5-di-tert-octylphenyl)-2H-benzotriazole;

(d) 2,2'-methylene-bis[6-(5-trifluoromethyl-2H-benzotriazol-2-yl)-4-tert-octylphenol];

(e) methylene-2-[4-tert-octyl-6-(2H-benzotriazol-2-yl)phenol]2'-[4-tert-octyl-6-(5-trifluoromethyl-2H-benzotriazol-2-yl)phenol];

(f) 3-(5-trifluoromethyl-2H-benzotriazol-2-yl)-5-tert-butyl-4-hydroxyhydrocinnamic acid;

(g) methyl 3-(5-trifluoromethyl-2H-benzotriazol-2-yl)-5-tert-butyl-4-hydroxyhydrocinnamate;

(h) isooctyl 3-(5-trifluoromethyl-2H-benzotriazol-2-yl)-5-tert-butyl-4-hydroxyhydrocinnamate;

(i) 5-trifluoromethyl-2-[2-hydroxy-5-(3-hydroxypropyl)phenyl]-2H-benzotriazole;

(j) 5-butylsulfonyl-2-(2-hydroxy-3-α-cumyl-5-tert-octylphenyl)-2H-benzotriazole;

(k) 5-octylsulfonyl-2-(2-hydroxy-3,5-di-α-cumylphenyl)-2H-benzotriazole;

(l) 5-dodecylsulfonyl-2-(2-hydroxy-3,5-di-tert-butylphenyl)-2H-benzotriazole;

(m) 5-octylsulfonyl-2-(2-hydroxy-3,5-di-tert-octylphenyl)-2H-benzotriazole;

(n) 5-trifluoromethyl-2-(2-hydroxy-3-α-cumyl-5-tert-butylphenyl)-2H-benzotriazole;

(o) 5-trifluoromethyl-2-(2-hydroxy-3-α-cumyl-5-nonylphenyl)-2H-benzotriazole;

(p) 5-trifluoromethyl-2-[2-hydroxy-3-α-cumyl-5-(2-hydroxyethyl)phenyl]-2H-benzotriazole;

(q) 5-trifluoromethyl-2-[2-hydroxy-3-α-cumyl-5-(3-hydroxypropyl)phenyl]-2H-benzotriazole;

(r) 5-trifluoromethyl-2-(2-hydroxy-3,5-di-tert-amylphenyl)-2H-benzotriazole;

(s) 5-trifluoromethyl-2-(2-hydroxy-3,5-di-tert-butylphenyl)-2H-benzotriazole;

(t) 5-trifluoromethyl-2-(2-hydroxy-3-dodecyl-5-methylphenyl)-2H-benzotriazole;

(u) 5-trifluoromethyl-2-[2-hydroxy-3-tert-butyl-5-(3-hydroxypropyl)phenyl]-2H-benzotriazole;

(v) 5-trifluoromethyl-2-[2-hydroxy-3-tert-butyl-5-(2-hydroxyethyl)phenyl]-2H-benzotriazole;

(w) 5-trifluoromethyl-2-[2-hydroxy-5-(2-hydroxyethyl)phenyl]-2H-benzotriazole;

(x) 5-trifluoromethyl-2-(2-hydroxy-3,5-di-α-cumylphenyl)-2H-benzotriazole;

(y) 5-fluoro-2-(2-hydroxy-3,5-di-α-cumylphenyl)-2H-benzotriazole;

(z) 5-butylsulfonyl-2-(2-hydroxy-3,5-di-α-cumylphenyl)-2H-benzotriazole;

(aa) 5-butylsulfonyl-2-(2-hydroxy-3,5-di-tert-butylphenyl)-2H-benzotriazole;

(bb) 5-butylsulfonyl-2-(2-hydroxy-3,5-di-tert-octylphenyl)-2H-benzotriazole;

(cc) 5-phenylsulfonyl-2-(2-hydroxy-3,5-di-tert-butylphenyl)-2H-benzotriazole; and (dd) 5-chloro-2-(2-hydroxy-3,5-di-α-cumylphenyl)-2H-benzotriazole.

Most preferably, the benzotriazoles of component (ii) of especial interest are (a) 5-trifluoromethyl-2-(2-hydroxy-3-α-cumyl-5-tert-octylphenyl)-2H-benzotriazole;

(b) 5-trifluoromethyl-2-(2-hydroxy-5-tert-octylphenyl)-2H-benzotriazole;

(c) 5-trifluoromethyl-2-(2-hydroxy-3,5-di-tert-octylphenyl)-2H-benzotriazole;

(g) methyl 3-(5-trifluoromethyl-2H-benzotriazol-2-yl)-5-tert-butyl-4-hydroxyhydrocinnamate;

(j) 5-butylsulfonyl-2-(2-hydroxy-3-α-cumyl-5-tert-octylphenyl)-2H-benzotriazole;

(n) 5-trifluoromethyl-2-(2-hydroxy-3-α-cumyl-5-tert-butylphenyl)-2H-benzotriazole;

(s) 5-trifluoromethyl-2-(2-hydroxy-3,5-di-tert-butylphenyl)-2H-benzotriazole;

(x) 5-trifluoromethyl-2-(2-hydroxy-3,5-di-α-cumylphenyl)-2H-benzotriazole;

(aa) 5-butylsulfonyl-2-(2-hydroxy-3,5-di-tert-butylphenyl)-2H-benzotriazole; and (cc) 5-phenylsulfonyl-2-(2-hydroxy-3,5-di-tert-butylphenyl)-2H-benzotriazole.

The instant adhesive stabilized by a benzotriazole in component (b) of the adhesive composition may also optionally contain from 0.01 to 10% by weight; preferably from 0.025 to 5% by weight, and most preferably from 0.1 to 3% by weight of additional coadditives such as antioxidants, other UV absorbers, hindered amines, phosphites or phosphonites, hydroxylamines, nitrones, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents, blowing agents and the like.

The stabilizers of the instant invention may readily be incorporated into the adhesive compositions by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized adhesive compositions of the invention may optionally also contain from about 0.01 to about 10%, preferably from about 0.025 to about 5%, and especially from about 0.1 to about 3% by weight of various conventional stabilizer coadditives, such as the materials listed below, or mixtures thereof.

1. Antioxidants 1.1. Alkylated monophenols, for example,
2,6-di-tert-butyl-4-methylphenol
2-tert-butyl-4,6-dimethylphenol
2,6-di-tert-butyl-4-ethylphenol
2,6-di-tert-butyl-4-n-butylphenol
2,6-di-tert-butyl-4-i-butylphenol
2,6-di-cyclopentyl-4-methylphenol
2-(αmethylcyclohexyl)-4,6-dimethylphenol 2,6-di-octadecyl-4-methylphenol
2,4,6-tri-cyclohexylphenol
2,6-di-tert-butyl-4-methoxymethylphenol 1.2. Alkylated hydroguinones, for example, 2,6-di-tert-butyl-4-methoxyphenol
2,5-di-tert-butyl-hydroquinone
2,5-di-tert-amyl-hydroquinone
2,6-diphenyl-4-octadecyloxyphenol 1.3. Hydroxylated thiodiphenyl ethers, for example, 2,2'-thio-bis-(6-tert-butyl-4-methylphenol)
2,2'-thio-bis-(4-octylphenol)
4,4'-thio-bis-(6-tert-butyl-3-methylphenol)
4,4'-thio-bis-(6-tert-butyl-2-methylphenol)

1.4. Alkylidene-bisphenols, for example, 2,2'-methylene-bis-(6-tert-butyl-4-methylphenol)
2,2'-methylene-bis-(6-tert-butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert-butylphenol)
2,2'-ethylidene-bis-(4,6-di-tert-butylphenol)
2,2'-ethylidene-bis-(6-tert-butyl-4-isobutylphenol)
4,4'-methylene-bis-(2,6-di-tert-butylphenol)
4,4'-methylene-bis-(6-tert-butyl-2-methylphenol)
1,1-bis-(5-tert-butyl-4-hydroxy-2-methylphenyl)-butane
2,6-di-(3-tert-butyl-5-methyl-2-hydroxybenzyl)-4-methylphenol
1,1,3-tris-(5-tert-butyl-4-hydroxy-2-methylphenyl)-butane
1,1-bis-(5-tert-butyl-4-hydroxy-2-methylphenyl)-3-n-dodecylmercaptobutane
ethyleneglycol bis-[3,3-bis-(3'-tert-butyl-4'-hydroxyphenyl)-butyrate]
di-(3-tert-butyl-4-hydroxy-5-methylphenyl)-dicyclopentadiene
di-[2-(3'-tert-butyl-2'-hydroxy-5'-methyl-benzyl)-6-tert-butyl-4-methylphenyl]terephthalate.

1.5. Benzyl compounds, for example, 1,3,5-tri-(3,5-di-tert-butyl-4-hydroxybenzyl)-2,4,6-trimethylbenzene
di-(3,5-di-tert-butyl-4-hydroxybenzyl) sulfide
3,5-di-tert-butyl-4-hydroxybenzyl-mercapto-acetic acid isooctyl ester
bis-(4-tert-butyl-3-hydroxy-2,6-dimethylbenzyl)dithiol terephthalate
1,3,5-tris-(3,5-di-tert-butyl-4-hydroxybenzyl) isocyanurate
1,3,5-tris-(4-tert-butyl-3-hydroxy-2,6-dimethylbenzyl) isocyanurate
3,5-di-tert-butyl-4-hydroxybenzyl-phosphoric acid dioctadecyl ester
3,5-di-tert-butyl-4-hydroxybenzyl-phosphoric acid monoethyl ester, calcium-salt 1.6. Acylaminophenols, for example, 4-hydroxy-lauric acid anilide
4-hydroxy-stearic acid anilide
2,4-bis-octylmercapto-6-(3,5-tert-butyl-4-hydroxyanilino)-s-triazine
octyl—N-(3,5-di-tert-butyl-4-hydroxyphenyl)-carbamate 1.7. Esters of β-(3,5-di-tert-butyl-4-hydroxyphenyl)-propionic acid with monohydric or polyhydric alcohols, for example,

| | |
|---|---|
| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.8. Esters of β-(5-tert-butyl-4-hydroxy-3-methylphenyl)-propionic acid with monohydric or polyhydric alcohols, for example,

| | |
|---|---|
| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.9. Amides of β-(3,5-di-tert-butyl-4-hydroxyphenyl)-propionic acid for example,
N,N'-di-(3,5-di-tert-butyl-4-hydroxyphenylpropionyl)-hexamethylenediamine
N,N'-di-(3,5-di-tert-butyl-4-hydroxyphenylpropionyl)-trimethylenediamine
N,N'-di-(3,5-di-tert-butyl-4-hydroxyphenylpropionyl)-hydrazine 1.10 Diarylamines, for example, diphenylamine, N-phenyl-1-naphthylamine, N-(4-tert-octylphenyl)-1-naphthylamine, 4,4'-di-tert-octyl-diphenylamine, reaction product of N-phenylbenzylamine and 2,4,4-trimethylpentene, reaction product of diphenylamine and 2,4,4-trimethylpentene, reaction product of N-phenyl-1-naphthylamine and 2,4,4-trimethylpentene.

2. UV Absorbers and Light Stabilizers 2.1. 2-(2'-Hydroxyphenyl)-benzotriazoles, for example, the 5'-methyl-, 3',5'-di-tert-butyl-, 5'-tert-butyl-,5'-(1,1,3,3-tetramethylbutyl)-, 5-chloro-3',5'-di-tert-butyl-, 5-chloro-3'-tert-butyl-5'-methyl-, 3'-sec-butyl-5'-tert-butyl-, 4'-octoxy, 3',5'-di-tert-amyl-3', 5'-bis-(α,α-dimethylbenzyl), 3'-tert-butyl-5'-(2-(omega-hydroxy-octa-(ethyleneoxy)carbonyl-ethyl)-, 3'-dodecyl-5'-methyl-, and 3'-tert-butyl-5'-(2-octyloxycarbonyl)ethyl-, and dodecylated-5'-methyl derivatives.

2.2. 2-Hydroxy-benzophenones, for example, the 4-hydroxy-, 4-methoxy-, 4-octoxy-, 4-decyloxy-, 4-dodecyloxy-, 4-benzyloxy, 4,2',4'-trihydroxy- and 2'-hydroxy-4,4'-dimethoxy derivatives.

2.3. Esters of optionally substituted benzoic acids for example, phenyl salicylate, 4-tert-butylphenyl salicylate, octylphenyl salicylate, dibenzoylresorcinol, bis-(4-tert-butylbenzoyl)-resorcinol, benzoylresorcinol, 3,5-di-tert-butyl-4-hydroxybenzoic acid 2,4-di-tert-butylphenyl ester and 3,5-di-tert-butyl-4-hydroxybenzoic acid hexadecyl ester.

2.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

2.5. Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazole, optionally with additional ligands.

2.6. Sterically hindered amines, for example bis-(2,2,6,6-tetramethylpiperidyl) sebacate, bis-(1,2,2,6,6-pentamethylpiperidyl) sebacate, n-butyl-3,5-di-tert.butyl-4-hydroxybenzyl malonic acid bis-(1,2,2,6,6-pentanemethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert-octylamino-2,6-dichloro-s-triazine, tris-(2,2,6,6-tetramethylpiperidyl)-nitrilotriacetate, tetrakis-(2,2,6,6-tetramethyl-4-piperidyl) 1,2,3,4-butanetetracarboxylate, 1,1' (1,2-ethanediyl)-bis-(3,3,5,5-tetramethylpiperazinone), bis (1-octyloxy-2,2,6,6-tetramethylpiperidin-4-yl) sebacate.

2.7. Oxalic acid diamides, for example, 4,4'-di-octyloxy-oxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy- as well as of o- and p-ethoxy-disubstituted oxanilides.

2.8. Hydroxyphenyl-s-triazines, for example 2,6-bis-(2,4-dimethylphenyl)-4-(2-hydroxy-4-octyloxyphenyl)-s-triazine; 2,6-bis-(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxyethoxy)phenyl]-6-(4-chlorophenyl)-s-triazine; 2,4-bis[2-hydroxy-4-(2-hydroxy-4-(2-hydroxyethoxy) phenyl]-6-(2,4-dimethylphenyl)-s-triazine; 2,4-bis[2-hydroxy-4-(2-hydroxyethoxy)-phenyl]-6-(4-bromophenyl)-s-triazine; 2,4-bis[2-hydroxy-4-(2-acetoxyethoxy)phenyl]-6-(4-chlorophenyl)-s-triazine, 2,4-bis(2,4-dihydroxyphenyl)-6-(2, 4-dimethylphenyl)-s-triazine.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert-butyl-4-hydroxyphenylpropionyl)-hydrazine, 3-salicyloylamino-1, 2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl) phosphite, trilauryl phosphite, trioctadecyl phosphite, di-stearyl-pentaerythritol diphosphite, tris-(2,4-di-tert-butylphenyl) phosphite, di-isodecyl-pentaerythritol diphosphite, di-(2,4,6-tri-tert-butylphenyl)-pentaerythritol diphosphite, di-(2,4-di-tert-butyl-6-methylphenyl)-pentaerythritol diphosphite, di-(2,4-di-tert-butylphenyl)pentaerythritol diphosphite, tristearyl-sorbitol triphosphite, tetrakis-(2,4-di-tert-butylphenyl) 4,4'-diphenylylenediphosphonite.

5. Compounds which destroy peroxide, for example, esters of β-thiodipropionic acid, for example the lauryl, stearyl, myristyl or tridecyl esters, mercapto-benzimidazole or the zinc salt of 2-mercaptobenzimidazole, zinc dibutyl-dithiocarbamate, dioctadecyl disulfide, pentaerythritol tetrakis-(β-dodecylmercapto)-propionate.

6. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecyl-hydroxylamine, N-heptadecyl-N-octadecylhydroxylamine, N,N-dialkylhydroxylamine derived from hydrogenated tallow amine.

7. Nitrones, for example, N-benzyl-alpha-phenyl nitrone, N-ethyl-alpha-methyl nitrone, N-octyl-alpha-heptyl nitrone, N-lauryl-alpha-undecyl nitrone, N-tetradecyl-alpha-tridecyl nitrone, N-hexadecyl-alpha-pentadecyl nitrone, N-octadecyl-alpha-heptadecylnitrone, N-hexadecyl-alpha-heptadecyl nitrone, N-octadecyl-alpha-pentadecyl nitrone, N-heptadecyl-alpha-heptadecyl nitrone, N-octadecyl-alpha-hexadecyl nitrone, nitrone derived from N,N-dialkylhydroxylamine derived from hydrogenated tallow amine.

8. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

10. Nucleating agents, for example, 4-tert-butyl-benzoic acid, adipic acid, diphenylacetic acid.

11. Fillers and reinforcing agents, for example, calcium carbonate, silicates, glass fibers, asbestos, talc, kaolin, mica, barium sulfate, metal oxides and hydroxides, carbon black, graphite.

12. Other additives, for example, plasticizers, lubricants, emulsifiers, pigments, optical brighteners, flameproofing agents, anti-static agents, blowing agents and thiosynergists such as dilauryl thiodipropionate or distearyl thiodipropionate.

13. Benzofuranones and indolinones, for example those disclosed in U.S. Pat. No. 4,325,863, U.S. Pat. No. 4,338, 244 or U.S. Pat.5,175,312, or 3-[4-(2-acetoxyethoxy) phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl) benzofuran-2-one], 5,7-di-tert-butyl-3-(4-ethoxyphenyl)-benzofuran-2-one, 3-(4-acetoxy-3,5-dimethylphenyl)-5,7-di-tert-butyl-benzofuran-2-one, 3-(3,5-di-methyl-4-pivaloyloxyphenyl)-5,7-di-tert-butyl-benzofuran-2-one.

The co-stabilizers, with the exception of the benzofuranones listed under 13, are added for example in concentrations of 0.01 to 10%, relative to the total weight of the material to be stabilized.

Further preferred compositions comprise, in addition to components (a) and (b) further additives, in particular phenolic antioxidants, light stabilizers or processing stabilizers.

Particularly preferred additives are phenolic antioxidants (item 1 of the list), sterically hindered amines (item 2.6 of the list), phosphites and phosphonites (item 4 of the list), UV absorbers (item 2 of the list) and peroxide-destroying compounds (item 5 of the list).

Additional additives (stabilizers) which are also particularly preferred are benzofuran-2-ones, such as described, for example, in U.S. Pat. No. 4,325,863, U.S. Pat. No. 4,338, 244 or U.S. Pat. No. 5,175,312.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinnammate), di-n-octadecyl 3,5-di-tert-butyl-4-hydroxybenzylphosphonate, 1,3,5-tris(3, 5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocyanurate, 1,1,3,-tris(2-methyl-4-hydroxy-5-tert-butylphenyl)butane, 1,3,5-tris[2-(3,5-di-tert-butyl-4-hydroxyhydrocinnamoyloxy) ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis (3,5-di-tert-butyl-4-hydroxyhydrocinnamamide), calcium bis (ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, N,N'-bis[2-(3, 5-di-tert-butyl-4-hydroxyhydrocinnamoyloxy)-ethyl]-oxamide, 2,4-bis(octylthiomethyl)-6-methylphenol, and 2,4-bis(octylthiomethyl)-6-tert-butylphenol.

A most preferred phenolic antioxidant is neopentanetetrayl tetrakis (3,5-di-tert-butyl-4-hydroxyhydrocinnamate), n-octadecyl 3,5-di-tert-butyl-4-hydroxyhydrocinnamnate, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol, 2,2'-ethylidene-bis(4,6-di-tert-butylphenol), 2,4-bis (octylthiomethyl)-6-methylphenol or 2,4-bis (octylthiomethyl)-6-tert-butylphenol.

The hindered amine compound of particular interest is selected from the group consisting of bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, 4-benzoyl-2,2,6,6-tetramethylpiperidine, 4-stearyloxy-2,2,6,6-tetramethylpiperidine, 3-n-octyl-7,7,9,9-tetramethyl-1,3,8-triaza-spiro [4.5]decane-2,4-dione, tris(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3, 20-diaza-21-oxodispiro[5.1.11.2] heneicosane, polycondensation product of 2,4-dichloro-6-tert-octylamino-s-triazine and 4,4'-hexamethylenebis (amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis-(amino-2,2,6,6-tetramethylpiperidine) and 1,2-dibromoethane, tetrakis(2,2,6,6-tetramethylpiperidin-4-yl) 1,2,3,4-butanetetracarboxylate, tetrakis(1,2,2,6,6-pentamethylpiperidin-4-yl) 1,2,3,4-butanetetracarboxylate, polycondensation product of 2,4-dichloro-6-morpholino-s-triazine and 4,4'-hexamethylenebis(amino-2,2,6,6-tetramethylpiperidine), N,N',N",N'''-tetrakis [(4,6-bis(butyl-1,2,2,6,6-pentamethylpiperidin-4-yl)-amino-s-triazin-2-yl]-1,10-diamino-4, 7-diazadecane, mixed [2,2,6,6-tetramethylpiperidin-4-yl/β, β,β',β'-tetramethyl-3,9-(2,4,8,10-tetraoxaspiro[5.5]-undecane)diethyl]1,2,3,4-butanetetracarboxylate, mixed [1,2,2,6,6-pentamethylpiperidin-4-yl/β, β,β',β'-tetramethyl-3,9-(2,4,8,10-tetraoxaspiro[5.5]-undecane) diethyl1,2,3,4-butanetetracarboxylate, octamethylene bis(2,2,6,6-tetramethylpiperidin-4-carboxylate), 4,4'-ethylenebis(2,2,6,6-tetramethylpiperazin-3-one), N-2,2,6,6-tetramethylpiperidin-4-yl-n-dodecylsuccinimide, N-1,2,2,6,6-pentamethylpiperidin-4-yl-n-dodecylsuccinimide, N1-acetyl-2,2,6,6-tetramethylpiperidin-4-yln-dodecylsuccinimide, 1-acetyl3-dodecyl-7,7,9,9-tetramethyl-1,3,8-triazaspiro[4.5]decane-2,4-dione, di-(1-octyloxy-2,2,6,6-tetramethylpiperidin-4-yl) sebacate, di-(1-cyclohexyloxy-2,2,6,6-tetramethylpiperidin-4-yl) succinate, 1-octyloxy-2,2,6,6-tetramethyl-4-hydroxy-piperidine, poly-{[6-tert-octylamino-s-triazin-2,4-diyl][2-(1-cyclohexyloxy-2,2,6,6-tetramethylpiperidin-4yl) imino-hexamethylene-[4-(1-cyclohexyloxy-2,2,6,6-tetramethylpiperidin-4-yl)imino], 2,4,6-tris[N-(1-cyclohexyloxy-2,2,6,6-tetramethylpiperidin-4-yl)-n-butylamino]-s-triazine, 2-(2-hydroxyethyl)amino-4, 6-bis[N-(1-cyclohexyloxy-2,2,6,6-tetramethylpiperidin-4-yl)-n-butylamino ]-s-triazine, 1,2-bis(3,3,5,5-tetramethylpiperazin-2-on-1-yl)ethane, 1,3,5-tris{N-cyclohexyl-N-[2-(3,3,5,5-tetramethylpiperazin-2-on-1-yl) ethyl]amino}-s-triazine, 1,3,5-tris{N-cyclohexyl-N-[2-(3,3,4,5,5-pentaamethylpiperazin-2-on-1-yl)ethyl]amino}-s-triazine, reaction of 2–4 equivalents of 2,4-bis[(1-cyclohexyloxy-2,2,6,6-tetramethylpiperidin-4-yl) butylamino ]-6-chloro-s-triazine with 1 equivalent of N,N'-bis(3-aminopropyl)ethylenediamine, bis[1-(2-hydroxy-2-methylpropoxy)-2,2,6,6-tetramethylpiperidin-4-yl]sebacate, mixture of bis[1-(2-hydroxy-2-methylpropoxy)-2,2,6,6-tetramethylpiperidin-4-yl]glutarate and bis[1-(2-hydroxy-2-methylpropoxy)-2,2,6,6-tetramethylpiperidin-4-yl]adipate, 4-hydroxy-1-(2-hydroxy-2-methylpropoxy)-2,2,6,6-tetramethylpiperidine and 4-octadecyloxy-1-(2-hydroxy-2-methylpropoxy)-2,2,6,6-tetramethylpiperidine.

A most preferred hindered amine compound is bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis(amino-2,2,6,6-tetramethylpiperidine), N,N',N",N'''-tetrakis [(4,6-bis(butyl-(1,2,2,6,6-pentamethylpiperidin-4-yl)amino)-s-triazine-2-yl]-1, 10-diamino-4,7-diazadecane. di-(1-octyloxy-2,2,6,6-tetramethylpiperidin-4-yl) sebacate, di-(1-cyclohexyloxy-2,2,6,6-tetramethylpiperidin-4-yl) succinate, 1-octyloxy-2,2,6,6-tetramethyl-4-hydroxy-piperidine, poly-{[6-tert-octylamino-s-triazin-2,4-diyl][2-(1-cyclohexyloxy-2,2,6,6-tetramethyl) piperidin-4-yl)imino-hexamethylene-[4-(1-cyclohexyloxy-2,2,6,6-tetramethylpiperidin-4-yl)imino], 2,4,6-tris[N-(1-cyclohexyloxy-2,2,6,6-tetramethylpiperidin-4-yl)-n-butylamino]-s-triazine, 2-(2-hydroxyethyl)amino-4, 6-bis[N-(1-cyclohexyloxy-2,2,6,6-tetramethylpiperidin-4-yl)-n-butylamino ]-s-triazine, 1,2-bis(3,3,5,5-tetramethylpiperazin-2-on-1-yl)ethane, 1,3,5-tris{N-cyclohexyl-N-[2-(3,3,5,5-tetramethylpiperazin-2-on-1-yl) ethyl]amino}-s-triazine, 1,3,5-tris{N-cyclohexyl-N-[2-(3,3,4,5,5-pentaamethylpiperazin-2-on-1-yl)ethyl]amino}-s-triazine, reaction of 2–4 equivalents of 2,4-bis[(1-cyclohexyloxy-2,2,6,6-tetramethylpiperidin-4-yl) butylamino]-6-chloro-s-triazine with 1 equivalent of N,N'-bis(3-aminopropyl)ethylenediamine, bis[1-(2-hydroxy-2-methylpropoxy)-2,2,6,6-tetramethylpiperidin-4-yl]sebacate, mixture of bis[1-(2-hydroxy-2-methylpropoxy)-2,2,6,6-tetramethylpiperidin-4-yl]glutarate and bis[1-(2-hydroxy-2-methylpropoxy)-2,2,6,6-tetramethylpiperidin-4-yl]adipate, 4-hydroxy-1-(2-hydroxy-2-methylpropoxy)-2,2,6,6-tetramethylpiperidine or 4-octadecyloxy-1-(2-hydroxy-2-methylpropoxy)-2,2,6,6-tetramethylpiperidine.

The instant composition can additionally contain another UV absorber selected from the group consisting of the benzotriazoles, s-triazines, the oxanilides, the hydroxybenzophenones, benzoates and the α-cyanoacrylates.

As described above, the laminated or multilayer constructions which use an adhesive layer described above containing 2-(2-hydroxy-3-α-cumyl-5-tert-octylphenyl)-2H-benzotriazole benzotriazole, 5-chloro-2-(2-hydroxy-3-α-cumyl-5-tert-octylphenyl)-2H-benzotriazole, 5-fluoro-2-(2-hydroxy-3-α-cumyl-5-tert-octylphenyl)-2H-benzotriazole, 2-(2-hydroxy-3-α-cumyl-5-tert-butylphenyl)-2H-benzotriazole benzotriazole, 5-chloro-2-(2-hydroxy-3-α-cumyl-5-tert-butylphenyl)-2H-benzotriazole or 5-fluoro-2-(2-hydroxy-3-α-cumyl-5-tert-butylphenyl)-2H-benzotriazole alone; or as group (i) in combination with a highly soluble, photostable, red-shifted benzotriazole of group (ii) of formula I, II or III; or containing any of the combinations of benzotriazole compounds described above as component (b), are selected from, but not limited to, the group consisting of (a) Retroreflective Sheets and Signs and Conformable Marketing Sheets;
(b) Solar Control Films of Various Construction;
(c) Corrosion Resistant Silver Mirrors and Solar Reflectors;
(d) Reflective Print Labels;
(e) UV Absorbing Glasses and Glass Coatings;
(f) Electrochromic Devices;
(g) Films/Glazings;
(h) Windscreens and Intermediate Layers; and
(i) Optical Films.

Preferably, the laminated or multilayer constructions which use an adhesive layer containing a benzotriazole of component (b) are selected from the group consisting of (a) Retroreflective Sheets and Signs and Conformable Marketing Sheets;
(b) Solar Control Films of Various Construction;
(e) UV Absorbing Glasses and Glass Coatings;
(g) Films/Glazings; and
(h) Windscreens and Intermediate Layers.

Most especially the laminated or multilayer constructions are (b) Solar Control Films of Various Construction; or
(h) Windscreens and Intermediate Layers.

The adhesive of component (a) which can be used in a laminated or multilayer article is selected from, but not limited to, the group consisting of (i) Pressure Sensitive Adhesives;
(ii) Rubber-Based Adhesives;
(iii) Solvent and/or Emulsion Based Adhesives;
(iv) Hot Melt Adhesives; and
(v) Natural Product Based Adhesives.

The adhesives are selected from the following chemical groups (i) Polyurethanes;
(ii) Polyacrylics;
(iii) Epoxys;
(iv) Phenolics;
(v) Polyimides;
(vi) Poly(vinyl butyral);
(vii) Polycyanoacrylates;
(viii) Polyacrylates;
(ix) Ethylene/acrylic acid copolymers and their salts (ionomers);
(x) Silicon polymers;
(xi) Poly(ethylene/vinyl acetate);
(xii) Atatic polypropylene;
(xiii) Styrene-diene copolymers;
(xiv) Polyamides;
(xv) Hydroxyl-terminated polybutadiene;
(xvi) Polychloroprene;
(xvii) Poly(vinyl acetate);
(xviii) Carboxylated styrene/butadiene copolymers;
(xix) Poly(vinyl alcohol); and
(xx) Polyesters.

The following optional components are often also present in adhesive formulations and are presented here for illustrative purposes only and are not meant to limit the total adhesive compositions in any way. These optional components include plasticizers, adhesion promoters, waxes, petroleum waxes, elastomers, tackifier resins, oils, resins, polymers, rosin, modified rosin or rosin derivatives, hydrocarbon resins, terpene resins, paraffin wax, microcrystalline wax, synthetic hard wax and/or polyethylene wax. The amounts of these coadditives are those normally used in adhesive formulations.

Although in the instant invention, the instant benzotriazoles are intended for use in the adhesive and the adhesive layers of the laminated or multilayer articles, it is clear that the same beneficial UV absorption protection would be afforded to the articles if said benzotriazoles are also incorporated into the other layers of the articles, e.g. polymeric films and any dye or pigment present therein, whether by direct incorporation, by coextrusion or by migration from the adhesive layer into said other layer(s).

These polymers are those selected from the group consisting of (1) polyolefins;
(2) mixtures of polyolefins;
(3) copolymers of monoolefins and diolefins or other vinyl monomers;
(4) polystyrene, poly(p-methylstyrene) or poly(α-methylstyrene);
(5) copolymers of styrene or α-methylstyrene with dienes or acrylic derivative;
(6) graft copolymers of styrene or α-methylstyrene;
(7) halogen containing polymers;
(8) polymers derived from α,β-unsaturated acids and derivatives thereof;
(9) copolymers of monomers of (8) with each other or other unsaturated monomers;
(10) polymers derived from unsaturated alcohols and amines or the acyl derivatives or acetals thereof;
(11) polyacetals such as polyoxymethylene and those polyoxymethylenes which contain ethylene oxide as a comonomer, polyacetals modified with thermoplastic polyurethanes, acrylates or MBS;
(12) polyurethanes;
(13) polyamides and copolyamides from diamines and dicarboxylic acids and/or from aminocarboxylic acids or the corresponding lactams;
(14) polyureas or polyimides;
(15) polyesters derived from dicarboxylic acids and diols and/or from hydroxycarboxylic acids or the corresponding lactones, especially poly(ethylene terephthalate) (PET) and poly(ethylene 2,6-naphthalenedicarboxylate) (PEN);

(16) polycarbonates and polyester carbonates;
(17) polysulfones and polyether sulfones;
(18) crosslinked polymers derived from aldehydes on the one hand and phenols, ureas and melamines on the other hand;
(19) unsaturated polyester resins derived from copolyesters of saturated and unsaturated dicarboxylic acids with polyhydric alcohols and vinyl compounds as crosslinking agents;
(20) crosslinkable acrylic resins derived from substituted acrylates;
(21) blends of the aforementioned polymers;
(22) polysiloxanes;
(23) polyketimines in combination with unsaturated acrylic polyacetoacetate resins or with unsaturated acrylic resins;
(24) radiation curable compositions containing ethylenically unsaturated monomers or oligomers and a polyunsaturated aliphatic oligomer; and
(25) ionomers (copolymers of ethylene/acrylic acid and their salts).

Additionally, the instant adhesives particularly when the adhesive is poly(vinyl butyral) may be inserted between two (or more) layers of glass such as in an automobile windshield.

Preferably the adhesive component (a) is a resin selected from the group consisting of poly(vinyl butyral), ethylene/vinyl acetate copolymers, polyacrylics, polyacrylates, natural rubber, polycyanoacrylates, poly(vinyl alcohol), styrene/butadiene rubber, phenolics, urea-formaldehyde polymers, epoxy resins, vinyl polymers, polyamides, polyurethanes, polyesters and styrene block copolymers.

Most especially, the adhesive of component (a) is a resin selected from the group consisting of poly(vinyl butyral), ethylene/vinyl acetate copolymers, polyacrylics, polyacrylates, natural rubber, polycyanoacrylates, poly(vinyl alcohol), styrene/butadiene rubber, phenolics, vinyl polymers, polyurethanes and styrene block copolymers.

The especially preferred adhesive component are the polyacrylates.

The following examples are for illustrative purposes only and are not to be construed to limit the instant invention in any manner whatsoever.

EXAMPLE 1

UV Absorption Spectra

Various instant benzotriazoles substituted on the phenyl ring with a 3-α-cumyl moiety and a 5-tert-octyl group and have a maximum absorbance value and the given wavelength as seen below. The UV spectra are measured in ethyl acetate solution at approximately 20 mg/L concentration.

| Compound* | λmax (nm) | absorbance at 375 (nm) |
|---|---|---|
| A | 345 | 0.28 |
| B | 352 | 0.40 |
| C | 348 | 0.33 |
| D | 362 | 0.50 |
| E | 358 | 0.42 |

*A is 2-(2-hydroxy-3-α-cumyl-5-tert-octylphenyl)-2H-benzotriazole.
B is 5-chloro-2-(2-hydroxy-3-α-cumyl-5-tert-octylphenyl)-2H-benzotriazole.
C is 5-trifluoromethyl-2-(2-hydroxy-3-α-cumyl-5-tert-octylphenyl)-2H-benzotriazole.
D is 5-phenylsulfonyl-2-(2-hydroxy-3-α-cumyl-5-tert-octylphenyl)-2H-benzotriazole.
E is 5-methoxycarbonyl-2-(2-hydroxy-3-α-cumyl-5-tert-octylphenyl)-2H-benzotriazole.

EXAMPLE 2

UV Absorption Spectra

The maximum absorbance value and the given wavelength of various blends of benzotriazoles are determined as seen below. The UV spectra are measured in ethyl acetate solution at approximately 20 mg/L concentration.

| Mixture of Compounds* | λmax (nm) | absorbance at 375 (nm) |
|---|---|---|
| A | 345 | 0.24 |
| B | 349 | 0.39 |
| C | 352 | 0.46 |

*A is 3:1 mixture by weight of 2-(2-hydroxy-3-α-cumyl-5-tert-octylphenyl)-2H-benzotriazole (TINUVIN ® 928, Ciba) and 5-trifluoromethyl-2-(2-hydroxy-3-α-cumyl-5-tert octylphenyl)-2H-benzotriazole.
B is 1:3 mixture by weight of 2-(2-hydroxy-3,5-di-α-cumylphenyl-2H-benzotriazole (TINUVIN ® 900, Ciba) and 5-trifluoromethyl-2-(2-hydroxy-3-α-cumyl-5-tert-octylphenyl)-2H-benzotriazole.
C is 1:3 mixture by weight of 5-chloro-2-(2-hydroxy-3,5-di-tert-butylphenyl)-2H-benzotriazole (TINUVIN ® 327, Ciba) and 5-trifluoromethyl-2-(2-hydroxy-3-α-cumyl-5-tert-octylphenyl)-2H-benzotriazole.

EXAMPLE 3

Benzotriazole Solubility in Adhesive

To measure the solubility of the various test compounds, the benzotriazole compound is added to a typical adhesive GELVA® 263 (Solutia) which is a 44.5% solution of a polyacrylate in a mixture of ethyl acetate and hexane. The polyacrylate is a copolymer of methyl methacrylate, 2-ethylhexyl methacrylate and glycidyl methacrylate.

The test benzotriazole is dissolved in 5 mL of ethyl acetate, toluene or a mixture of ethyl acetate and toluene. To the solution is added 5 g of GELVA® 263 and 2–3 mL of the resulting solution is placed into individual watch glasses. Solubility is then evaluated based upon observed crystallization once the solvent has evaporated. Observations start after several hours and then continue over a period of several weeks.

The solubility values given in the table below are approximate maximum concentrations where no sign of subsequent crystallization is evident. Solubilities are reported in weight of total benzotriazole added to GELVA® 263 as is. From these data it clear that the instant benzotriazole is considerably more soluble in adhesives (in this case GELVA® 263)

than many benzotriazoles of the prior art. The use of many benzotriazoles in adhesives has been limited in the past by the limited solubility and compatibility of some benzotriazole compounds. By using the instant benzotriazole, the use levels can be increased substantially to add greatly increased stabilization protection which is further augmented by the excellemt photostability of the instant benzotriazole.

| Compound* | Trade Name or Class | Solubility without Crystallization (%) |
|---|---|---|
| A | 5-ethylsulfonyl | <1 |
| B | TINUVIN ® 900 | 2.0 |
| C | TINUVIN ® 327 | 2.0 |
| D | 5-butylsulfonyl | 4.0 |
| E | 5-$CF_3$ | 4.0 |
| F | 5,5'-$CF_3$ | 4.0 |
| G | 5-butylsulfonyl | 8.0 |
| H | 5-$CF_3$ | 8.0 |
| I | 5-$CF_3$ | 8.0 |
| J | 5-methoxycarbonyl-methylsulfinyl | 8.0 |
| K | 5-phenylsulfonyl | 11.3 |
| L | 5-phenylsulfonyl | 11.3 |
| M | 5-$CF_3$ | 22.6 |
| N | 5-$CF_3$ | 22.6 |
| O | TINUVIN ® 928 | 22.6 |
| P | 5-chloro | 22.6 |

*A is 5-ethylsulfonyl-2-(2-hydroxy-5-methylphenyl)-2H-benzotriazole.
B is 2-(2-hydroxy-3,5-di-α-cumylphenyl)-2H-benzotriazole.
C is 5-chloro-2-(2-hydroxy-3,5-di-tert-butylphenyl)-2H-benzotriazole.
D is 5-butylsulfonyl-2-(2-hydroxy-3,5-di-tert-butylphenyl)-2H-benzotriazole.
E is 5-trifluoromethyl-2-(2-hydroxy-3,5-di-α-cumylphenyl)-2H-benzotriazole.
F is 2,2'-methylene-bis[6-(5-trifluoromethyl-2H-benzotriazol-2-yl)-4-tert-octylphenol].
G is 5-butylsulfonyl-2-(2-hydroxy-3-α-cumyl-5-tert-octylphenyl)-2H-benzotriazole;
H is 5-trifluoromethyl-2-(2-hydroxy-5-tert-octylphenyl)-2H-benzotriazole;
I is methyl 3-(5-trifluoromethyl-2H-benzotriazol-2-yl)-5-tert-butyl-4-hydroxyhydrocinnamate.
J is 5-methoxycarbonylmethylsulfinyl-2-(2-hydroxy-3,5-di-tert-butylphenyl)-2H-benzotriazole.
K is methyl 3-(5-phenylsulfonyl-2H-benzotriazol-2-yl)-5-tert-butyl-4-hydroxyhydrocinnamate.
L is 5-phenylsulfonyl-2-(2-hydroxy-3,5-di-tert-butylphenyl)-2H-benzotriazole.
M is 5-trifluoromethyl-2-(2-hydroxy-3-α-cumyl-5-tert-octylphenyl)-2H-benzotriazole.
N is 5-trifluoromethyl-2-(2-hydroxy-3,5-di-tert-octylphenyl)-2H-benzotriazole.
O is 2-(2-hydroxy-3-α-cumyl-5-tert-octylphenyl)-2H-benzotriazole.
P is 5-chloro-2-(2-hydroxy-3-α-cumyl-5-tert-butylphenyl-2H-benzotriazole.

EXAMPLE 4

Solubility in Adhesive of Benzotriazole Blends

Following the procedure of Example 3, the solubility in GELVA® 263 (Solutia) of various mixtures of benzotriazoles is determined. The results are seen in the table below.

| Mixture of Compounds* | Solubility without Crystallization (%) |
|---|---|
| A | 22.6 |
| B | 22.6 |
| C | 22.6 |
| D | 22.6 |

*A is 3:1 mixture by weight of 2-(2-hydroxy-3-α-cumyl-5-tert-octylphenyl)-2H-benzotriazole (TINUVIN ® 928, Ciba) and 5-trifluoromethyl-2-(2-hydroxy-3-α-cumyl-5-tert-octylphenyl)-2H-benzotriazole.
B is 1:3 mixture by weight of 2-(2-hydroxy-3,5-di-α-cumylphenyl)-2H-benzotriazole (TINUVIN ® 900, Ciba) and 5-trifluoromethyl-2-(2-hydroxy-3-α-cumyl-5-tert-octylphenyl)-2H-benzotriazole.
C is 1:3 mixture by weight of 5-chloro-2-(2-hydroxy-3,5-di-tert-butylphenyl)-2H-benzotriazole (TINUVIN ® 327, Ciba) and 5-trifluoromethyl-2-(2-hydroxy-3-α-cumyl-5-tert-octylphenyl)-2H-benzotriazole.
D is 3:1 mixture by weight of 2-(2-hydroxy-3-α-cumyl-5-tert-octylphenyl)-2H-benzotriazole (TINUVIN ® 928, Ciba) and 5-chloro-2-(2-hydroxy-3,5-di-tert-butylphenyl)-2H-benzotriazole (TINUVIN ® 327, Ciba).

EXAMPLE 5

Weathering Experiments

To ascertain the effect of durability and loss rate of various benzotriazole test compounds, the following test is carried out on adhesive compositions in selected articles.

GELVA® 263 (Solutia) adhesive is described in Example 3. A biaxially oriented poly(ethylene terephthalate) (PET) film is obtained from United States Plastics.

The GELVA® 263 is reduced 50% by dilution with ethyl acetate to a final resin solids content of 23%. The test compound is dissolved in the GELVA® 263 solution and samples are prepared in duplicate. The formulations seen in the table below are based on total coating solids. Approximately 8 micron coatings are applied to 1.5 inch glass discs for each formulation using a Headway Research Inc. Photo Resist Spinner (Model EC101DT) operating at 5000 rpm for 10 seconds. All formulations receive the same 80° C. ×3 minute bake in a Hereaus model LUT 605 F oven operating at 3 air changes/minute.

Since the adhesive remains tacky even after baking a direct thickness measurement is not possible. Indirect film thickness is determined by creating an adhesive sandwich between to layers of PET film and comparing its thickness versus two PET sheets without adhesive using magnetic induction methodology.

The spin coating conditions are thus obtained. Further, since the spin coating conditions are not changed for applying the adhesive onto the glass, very little if any thickness variations are expected. After curing it in an oven, a layer of PET (ca 2 mils) is placed over the adhesive and pressed down.

Absorbance spectra are collected using a Perkin Elmer Lambda 19 Spectrophotometer running UVWINLAB software. Absorbance data are collected from 400–300 nm every half nanometer at a speed of 240 nm/minute and a slit width of 2 nm.

Weathering is done at a controlled irradiance at 6500 W. The cycle is as follows: 3.8 hours straight irradiance with no water spray, followed by one hour darkness. In the light cycle, the black panel temperature is controlled at 89° C. The chamber (dry bulb) temperature is 62° C. in the light cycle. The relative humidity in the light cycle is in the range of 50–55% and in the dark cycle 95%. The chamber (dry bulb) temperature is 38° C. in the dark cycle.

The test samples are placed in a Xenon Arc Weather-O-meter with the glass facing the Xenon lamp to emulate articles such as solar films. UV spectra are obtained at about 250 hour intervals. UV spectra are obtained at 500 hours and the samples are rotated to insure that all samples receive similar weathering conditions.

To follow the loss of the UV absorber from the adhesive composition, UV spectra measured initially and after weathering. The UV spectrophotometer measure absorbance linearly up to 5.5 absorbance units using a reference beam attenuation technique.

It is assumed that the degradation products for the UV absorber do not contribute to the UV spectrum. This is tested by following the ratio of absorbance of the band at 300 nm and the band at about 340 nm. The ratio does not change upon weathering the sample. This suggests that the UV spectrum of the weathered films correspond to the amount of UV absorber remaining in the film with very little if any contribution to the spectrum by the photodegradants.

The results after 893 hours exposure are given in the table below.

| Compound (%)* | Initial Absorbance | Final Absorbance | Absorbance Loss |
| --- | --- | --- | --- |
| I (8%) | 2.998 | 2.048 | 0.950 |
| II (10%) | 2.810 | 2.013 | 0.797 |
| III (5%) | 1.561 | 1.241 | 0.320 |
| IV (10%) | 2.181 | 1.904 | 0.277 |
| IV (10%) + V (0.5%) | 2.088 | 1.974 | 0.114 |

*% is the weight amount in formulation.
I is 2,2'-dihydroxy-4-methoxy benzophenone.
II is octyl 3-(2H-benzotriazol-2-yl)-5-tert-butyl-4-hydroxyhydrocinnamate.
III is 2-(2-hydroxy-3-α-cumyl-5-tert-octylphenyl)-2H-benzotriazole.
IV is 5-trifluoromethyl-2-(2-hydroxy-3-α-cumyl-5-tert-octylphenyl)-2H-benzotriazole.
V is bis(1-octyloxy-2,2,6,6-tetramethylpiperidin-4-yl) sebacate.

These data clearly show that the instant benzotriazole is especially durable in adhesives as measured by the low loss rate of absorbance values after exposure to actinic radiation. The instant benzotriazoles such as 2-(2-hydroxy-3-α-cumyl-5-tert-octyl-phenyl)-2H-benzotriazole even though not red-shifted as well as the red-shifted benzotriazoles are far superior to the benzophenones in adhesive compositions. Furthermore, the combination of the benzotriazoles with a hindered amine stabilizer offers quite superior performance. In summary, the instant benzotriazoles combine both great photostability and unexpectedly high solubility in adhesive systems.

EXAMPLE 6

Weathering Experiments

Following the general procedure of Example 5, a GELVA® 263 (Solutia) adhesive described in Example 3, which contains 8% by weight of a test compound, is placed between a sheet of glass and a biaxially oriented film of poly(ethylene terephthalate) (PET) described in Example 5. The structure is then exposed to weathering for 1338 hours as described in Example 5.

The results are seen in the table below. Each test sample also contains 0.5% of the hindered amine bis(1-octyloxy-2,2,6,6-tetramethylpiperidin-4-yl) sebacate.

| Compound (%)* | Initial Absorbance | Final Absorbance | Absorbance Loss |
| --- | --- | --- | --- |
| I (8%) | 2.88 | 1.91 | 0.97 |
| II (8%) | 1.96 | 1.59 | 0.37 |

*% is the weight amount in formulation.
I is 2,2'-dihydroxy-4-methoxybenzophenone.
II is 2-(2-hydroxy-3-α-cumyl-5-tert-octylphenyl)-2H-benzotriazole.

These data clearly show that the instant benzotriazoles substituted at the ortho position of the hydroxyphenyl ring with an α-cumyl moiety are especially durable in adhesives as measured by the low loss rate of absorbance values after exposure to actinic radiation. Additionally, it is seen that these benzotriazoles are far superior to the benzophenones in adhesive compositions. Furthermore, the combination of the benzotriazoles with a hindered amine stabilizer offers quite superior performance. In summary, the instant α-cumyl substituted benzotriazoles combine both great photostability and unexpectedly high solubility in adhesive systems.

EXAMPLE 7

Windshield Interlayer Assembly

When an adhesive composition containing a benzotriazole UV absorber is placed between two sheets of glass, the assembly resembles a typical windshield. In this confined environment, there is no chance that the benzotriazole stabilizer can escape by volatility since the glass sheets provide a impervious container for the adhesive interlayer. The photostability and durability of the soluble benzotriazole stabilizer is now paramount. Benzotriazoles whose structures causes them to be volatile and which precludes their use in other types of applications can be used in such windshield interlayer assemblies with impunity to achieve long lasting and stable windshield structures.

A windshield or windscreen prototype structure is exposed to weathering according to the procedure described in Example 5. The GELVA® 263 (Solutia) adhesive is placed between two sheets of glass and additionally contains 8% by weight of selected test UV absorbers. The structure is then exposed to weathering for 1338 hours as described in Example 5.

The results are seen in the table below. Each test sample also contains 0.5% of the hindered amine bis(1-octyloxy-2,2,6,6-tetramethylpiperidin-4-yl) sebacate.

| Compound (%)* | Absorbance Loss |
| --- | --- |
| I (8%) | 0.81 |
| II (8%) | 0.35 |

*% is the weight amount in formulation.
I is 2,2'-dihydroxy-4-methoxybenzophenone.
II is 2-(2-hydroxy-3-α-cumyl-5-tert-octylphenyl)-2H-benzotriazole.

These data clearly show that the instant benzotriazoles substituted at the ortho position of the hydroxyphenyl ring with an α-cumyl moiety are especially durable in adhesives as measured by the low loss rate of absorbance values after exposure to actinic radiation. Additionally, it is seen that these benzotriazoles are far superior to the benzophenones in adhesive compositions. Furthermore, the combination of the benzotriazoles with a hindered amine stabilizer offers quite superior performance. In summary, the instant α-cumyl substituted benzotriazoles combine both great photostability and unexpectedly high solubility in adhesive systems.

EXAMPLE 8

The instant benzotriazole UV absorbers can be used in film and rigid plastic protective overlaminates for printed matter and photographs providing excellent photostability.

EXAMPLE 9

The instant benzotriazole UV absorbers can be used in backlit displays to provide excellent long term stabilization.

EXAMPLE 10

The instant benzotriazole UV absorbers can be used in semi-transparent and opaque window displays, signs and decals wherein a film or rigid plastic graphic is laminated to window glass to provide excellent long term stabilization.

EXAMPLE 11

The instant benzotriazole UV absorbers can be used in clear/tinted anti-graffiti films used over class, metal or plastic substrates to provide excellent long term stabilization.

EXAMPLE 12

The instant benzotriazole UV absorbers can be used in clear anti-lacerative or "security" films used over or between layers of glass or polycarbonate to provide long term stabilization.

EXAMPLE 13

The instant benzotriazole UV absorbers can be used in decorative and protective films and decals for painted surfaces such as on automobiles, buses, equipment and other exterior products to provide long term stabilization.

What is claimed is:

1. A stabilized adhesive composition, suitable for use as an adhesive layer in a laminted article or multilayer construction, which comprises
    (a) an adhesive selected from the group consisting of
        (i) polyurethanes;
        (ii) polyacrylics;
        (vi) poly(vinyl butyral);
        (viii) polyacrylates;
        (xi) poly(ethylene/vinyl acetate);
        (xvii) poly(vinyl acetate); and
        (xx) polyesters; and
    (b) an effective stabilizing amount of a highly soluble and photostable benzotriazole which is 2-(2-hydroxy-3-α-cumyl-5-tert-octylphenyl)-2H-benzotriazole, 5-chloro-2-(2-hydroxy-3-α-cumyl-5-tert-octylphenyl)-2H-benzotriazole, 5-fluoro-2-(2-hydroxy-3-α-cumyl-5-tert-octylphenyl)-2H-benzotriazole, 2-(2-hydroxy-3-α-cumyl-5-tert-butylphenyl)-2H-benzotriazole, 5-chloro-2-(2-hydroxy-3-α-cumyl-5-tert-butylphenyl)-2H-benzotriazole or 5-fluoro-2-(2-hydroxy-3-α-cumyl-5-tert-butylphenyl)-2H-benzotriazole;
    with the proviso that the benzotriazole in component (b) exhibits enhanced durability and low loss of absorbance when exposed to actinic radiation as witnessed by an absorbance loss of less than 0.5 absorbance units after exposure for 893 hours or less than 0.8 absorbance units after exposure for 1338 hours in a Xenon Arc Weather-Ometer.

2. A composition according to claim 1 where the effective stabilizing amount of benzotriazole of component (b) is 0.1 to 20% by weight based on the adhesive composition.

3. A stabilized adhesive composition, suitable for use as an adhesive layer in a laminated article or multilayer construction, which comprises
    (a) an adhesive selected from the group consisting of
        (i) polyurethanes;
        (ii) polyacrylics;
        (vi) poly(vinyl butyral);
        (viii) polyacrylates;
        (xi) poly(ethylene/vinyl acetate);
        (xvii) poly(vinyl acetate); and
        (xx) polyesters; and
    (b) an effective stabilizing amount of a combination of
        (1) a highly photostable benzotriazole which is 2-(2-hydroxy-3,5-di-α-cumylphenyl)-2H-benzotriazole or a red-shifted benzotriazole which is 5-chloro-2-(2-hydroxy-3,5-di-tert-butylphenyl)-2H-benzotriazole or 5-chloro-2-(2-hydroxy-3-tert-butyl-5-methylphenyl)-2H-benzotriazole each of which has relatively low solubility in some adhesives; and
        (2) a solubilizing amount of a second benzotriazole having high solubility in said adhesives and selected from the group consisting of 2-(2-hydroxy-3,5-di-tert-butylphenyl)-2H-benzotriazole, 2-(2-hydroxy-3,5-di-tert-amylphenyl)-2H-benzotriazole, 2-(2-hydroxy-5-tert-octylphenyl)-2H-benzotriazole, 2-(2-hydroxy-3-sec-butyl-5-tert-butylphenyl)-2H-benzotriazole, 2-(2-hydroxy-3-α-cumyl-5-tert-octylphenyl)-2H-benzotriazole or 2-(2-hydroxy-3-α-cumyl-5-tert-butylphenyl)-2H-benzotriazole;
    with the proviso that the benzotriazole in component (b) exhibits enhanced durability and low loss of absorbance when exposed to actinic radiation as witnessed by an absorbance loss of less than 0.5 absorbance units after exposure for 893 hours or less than 0.8 absorbance units after exposure for 1338 hours in a Xenon Arc Weather-Ometer.

4. A composition according to claim 3 wherein the effective amount of the UV absorber of (1) plus (2) in component (b) is 0.1 to 20% by weight based on the adhesive composition.

5. A composition according to claim 3 wherein the relative amount of (1) to (2) by weight is from 75:25 to 25:75.

6. A composition according to claim 5 wherein the relative amount of (1) to (2) by weight is 50:50.

7. A stabilized adhesive composition, suitable for use as an adhesive layer in a laminated article or multilayer construction, which comprises
    (a) an adhesive selected from the group consisting of
        (i) polyurethanes;
        (ii) polyacrylics;
        (vi) poly(vinyl butyral);
        (viii) polyacrylates;
        (xi) poly(ethylene/vinyl acetate);
        (xvii) poly(vinyl acetate); and
        (xx) polyesters; and
    (b) an effective stabilizing amount of a combination of
        (i) a highly soluble and photostable benzotriazole which is 2-(2-hydroxy-3-α-cumyl-5-tert-octylphenyl)-2H-benzotriazole, 5-chloro-2-(2-hydroxy-3-α-cumyl-5-tert-octylphenyl)-2H-benzotriazole, 5-fluoro-2-(2-hydroxy-3-α-cumyl-5-tert-octylphenyl)-2H-benzotriazole, 2-(2-hydroxy-3-α-cumyl-5-tert-butylphenyl)-2H-benzotriazole, 5-chloro-2-(2-hydroxy-3-α-cumyl-5-tert-butylphenyl)-2H-benzotriazole or 5-fluoro-2-(2-hydroxy-3-α-cumyl-5-tert-butylphenyl)-2H-benzotriazole; or the highly photostable benzotriazole which is 2-(2-hydroxy-3,5-di-α-cumyl-phenyl)-2H-benzotriazole; and (ii) a highly soluble, red-shifted, photostable benzotriazole which is a compound of formula I, II or III

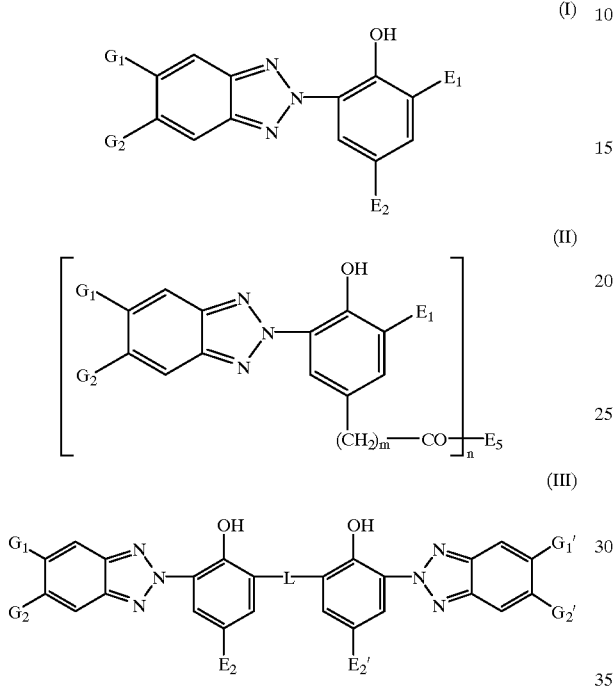

wherein $G_1$ and $G_1'$ are independently hydrogen or halogen, $G_2$ and $G_2'$ are independently halogen, nitro, cyano, perfluoroalkyl of 1 to 12 carbon atoms, —$COOG_3$, —$P(O)(C_6H_5)_2$, —CO—$G_3$, —CO—NH—$G_3$, —CO—N($G_3$)$_2$, —N($G_3$)—CO—$G_3$, $E_3SO$— or $E_3SO_2$—; or $G_2'$ is also hydrogen, $G_3$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $G_6$ is perfluoroalkyl of 1 to 12 carbon atoms, $G_7$ is hydrogen or perfluoroalkyl of 1 to 12 carbon atoms, $E_1$ is hydrogen, straight or branched chain alkyl of 1 to 24 carbon atoms, straight or branched chain alkenyl of 2 to 24 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or $E_1$ is alkyl of 1 to 24 carbon atoms substituted by one or two hydroxy groups, $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by one to three alkyl of 1 to 4 carbon atoms; or $E_2$ and $E_2'$ are independently said alkyl of 1 to 24 carbon atoms or said alkenyl of 2 to 18 carbon atoms substituted by one or more —OH, —$OCOE_{11}$, —$OE_4$, —NCO, —$NH_2$, —$NHCOE_{11}$, —$NHE_4$ or —N($E_4$)$_2$, or mixtures thereof, where $E_4$ is straight or branched chain alkyl of 1 to 24 carbon atoms; or said alkyl or said alkenyl interrupted by one or more —O—, —NH— or —$NE_4$— groups or mixtures thereof and which can be unsubstituted or substituted by one or more —OH, —$OE_4$ or —$NH_2$ groups or mixtures thereof;

n is 1 or 2, when n is 1, $E_5$ is $OE_6$ or $NE_7E_8$, or $E_5$ is —$PO(OE_{12})_2$, —$OSi(E_{11})_3$ or —OCO—$E_{11}$, or straight or branched chain $C_1$–$C_{24}$alkyl which is interrupted by —O—, —S— or —$NE_{11}$ and which can be unsubstituted or substituted by —OH or —OCO—$E_{11}$, $C_5$–$C_{12}$ cycloalkyl which is unsubstituted or substituted by —OH, straight chain or branched $C_2$–$C_{18}$alkenyl which is unsubstituted or substituted by —OH, $C_7$–$C_{15}$aralkyl, —$CH_2$—CHOH—$E_{13}$ or glycidyl, $E_6$ is hydrogen, straight or branched chain $C_1$–$C_{24}$alkyl which is unsubstituted or substituted by one or more OH, $OE_4$ or $NH_2$ groups, or —$OE_6$ is —$(OCH_2CH_2)_wOH$ or —$(OCH_2CH_2)_wOE_{21}$ where w is 1 to 12 and $E_{21}$ is alkyl of 1 to 12 carbon atoms, $E_7$ and $E_8$ are independently hydrogen, alkyl of 1 to 18 carbon atoms, straight or branched chain $C_3$–$C_{18}$alkyl which is interrupted by —O—, —S— or —$NE_{11}$—, $C_5$–$C_{12}$cycloalkyl, $C_6$–$C_{14}$aryl or $C_1$–$C_3$hydroxylalkyl, or $E_7$ and $E_8$ together with the N atom are a pyrrolidine, piperidine, piperazine or morpholine ring, $E_5$ is —X—(Z)$_p$—Y—$E_{15}$ wherein X is —O— or —N($E_{16}$)—, Y is —O— or —N($E_{17}$)—, Z is $C_2$–$C_{12}$-alkylene, $C_4$–$C_{12}$-alkylene interrupted by one to three nitrogen atoms, oxygen atoms or a mixture thereof, or is $C_3$–$C_{12}$-alkylene, butenylene, butynylene, cyclohexylene or phenylene, each substituted by a hydroxyl group, m is zero, 1 or 2, p is 1, or p is also zero when X and Y are —N($E_{16}$)— and —N($E_{17}$)—, respectively, $E_{15}$ is a group —CO—C($E_{18}$)=C(H)$E_{19}$ or, when Y is —N($E_{17}$)—, forms together with $E_{17}$ a group —CO—CH=CH—CO—, wherein $E_{18}$ is hydrogen or methyl, and $E_{19}$ is hydrogen, methyl or —CO—X—$E_{20}$, wherein $E_{20}$ is hydrogen, $C_1$–$C_{12}$-alkyl or a group of the formula

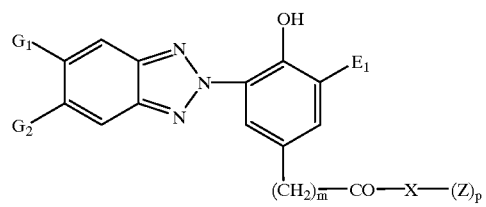

wherein the symbols $E_1$, $G_2$, X, Z, m and p have the meanings defined above, and $E_{16}$ and $E_{17}$ independently of one another are hydrogen, $C_1$–$C_{12}$-alkyl, $C_3$–$C_{12}$-alkyl interrupted by 1 to 3 oxygen atoms, or is cyclohexyl or $C_7$–$C_{15}$aralkyl, and $E_{16}$ together with $E_{17}$ in the case where Z is ethylene, also forms ethylene, when n is 2, $E_5$ is one of divalent radicals —O—$E_9$—O— or —N($E_{11}$)—$E_{10}$—N($E_{11}$)—, $E_9$ is $C_2$–$C_8$alkylene, $C_4$–$C_8$alkenylene, $C_4$alkynylene, cyclohexylene, straight or branched chain $C_4$–$C_{10}$alkylene which is interrupted by —O— or by —CH$_2$—CHOH—CH$_2$—O—$E_{14}$—O—CH$_2$—CHOH—CH$_2$—, $E_{10}$ being straight or branched chain $C_2$–$C_{12}$alkylene which may be interrupted by —O—, cyclohexylene, or

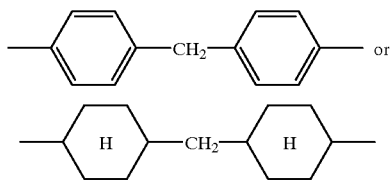

or $E_{10}$ and $E_{11}$ with the two nitrogen atoms form a piperazine ring, $E_{14}$ is straight or branched chain $C_2$–$C_8$alkylene, straight or branched chain $C_4$–$C_{10}$alkylene which is interrupted by —O—, cycloalkylene, arylene or

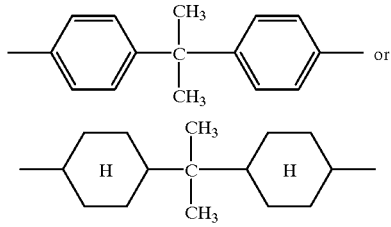

where $E_7$ and $E_8$ are independently hydrogen, alkyl of 1 to 18 carbon atoms or $E_7$ and $E_8$ together are alkylene of 4 to 6 carbon atoms, 3-oxapentamethylene, 3-iminopentamethylene or 3-methyliminopentamethylene, $E_{11}$ is hydrogen, straight or branched chain $C_1$–$C_{18}$alkyl, $C_5$–$C_{12}$cycloalkyl, straight or branched chain $C_2$–$C_{18}$alkenyl, $C_6$–$C_{14}$aryl or $C_7$–$C_{15}$aralkyl, $E_{12}$ is straight or branched chain $C_1$–$C_{18}$alkyl, straight or branched chain $C_3$–$C_{18}$alkenyl, $C_5$–$C_{10}$cycloalkyl, $C_6$–$C_{16}$aryl or $C_7$–$C_{15}$aralkyl, $E_{13}$ is H, straight chain or branched $C_1$–$C_{18}$alkyl which is substituted by —PO(O$R_{12}$)$_2$, phenyl which is unsubstituted or substituted by OH, $C_7$–$C_{15}$aralkyl or —CH$_2$O$E_{12}$, $E_3$ is alkyl of 1 to 20 carbon atoms, hydroxyalkyl of 2 to 20 carbon atoms, alkyl substituted by alkoxycarbonyl of 2 to 9 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms, and with the proviso that formula I does not represent 5-ethylsulfonyl-2-(2-hydroxy-5-methylphenyl)-2H-benzotriazole; 5-fluoro-2-(2-hydroxy-3-α-cumyl-5-tert-octylphenyl)-2H-benzotriazole; 5-fluoro-2-(2-hydroxy-3-α-cumyl-5-tert-butylphenyl)-2H-benzotriazole; 5-chloro-2-(2-hydroxy-3-α-cumyl-5-tert-octylphenyl)-2H-benzotriazole; 5-chloro-2-(2-hydroxy-3-α-cumyl-5-tert-octyl-phenyl)-2H-benzotriazole; 5-chloro-2-(2-hydroxy-3,5-di-tert-butylphenyl)-2H-benzotriazole; or 5-chloro-2-(2-hydroxy-3-tert-butyl-5-methylphenyl)-2H-benzotriazole; and with the further proviso that the benzotriazole in component (b) exhibits enhanced durability and low loss of absorbance when exposed to actinic radiation as witnessed by an absorbance loss of less than 0.5 absorbance units after exposure for 893 hours or less than 0.8 absorbance units after exposure for 1338 hours in a Xenon Arc Weather-Ometer.

8. A composition according to claim 7 wherein the effective amount of the UV absorber of (i) plus (ii) in component (b) is 0.1 to 20% by weight based on the adhesive composition.

9. A composition according to claim 7 wherein the relative amount by weight of (i) to (ii) is from 99:1 to 1:99.

10. A composition according to claim 9 wherein the relative amount by weight of (i) to (ii) is from 90:10 to 25:75.

11. A composition according to claim 10 wherein the relative amount of (i) to (ii) is 50:50.

12. A composition according to claim 7 wherein the benzotriazole of component (ii) is a compound which is (a) 5-trifluoromethyl-2-(2-hydroxy-3-α-cumyl-5-tert-octylphenyl)-2H-benzotriazole;

(b) 5-trifluoromethyl-2-(2-hydroxy-5-tert-octylphenyl)-2H-benzotriazole;

(c) 5-trifluoromethyl-2-(2-hydroxy-3,5-di-tert-octylphenyl)-2H-benzotriazole;

(d) 2,2'-methylene-bis [6-(5-trifluoromethyl-2H-benzotriazol-2-yl)-4-tert-octylphenol];

(e) methylene-2-[4-tert-octyl-6-(2H-benzotriazol-2-yl)phenol]2'-[4-tert-octyl-6-(5-trifluoromethyl-2H-benzotriazol-2-yl)phenol];

(f) 3-(5-trifluoromethyl-2H-benzotriazol-2-yl)-5-tert-butyl-4-hydroxyhydrocinnamic acid;

(g) methyl 3-(5-trifluoromethyl-2H-benzotriazol-2-yl)-5-tert-butyl-4-hydroxyhydrocinnamate;

(h) isooctyl 3-(5-trifluoromethyl-2H-benzotriazol-2-yl)-5-tert-butyl-4-hydroxyhydrocinnamate;

(i) 5-trifluoromethyl-2-[2-hydroxy-5-(3-hydroxypropyl)phenyl]-2H-benzotriazole;

(j) 5-butylsulfonyl-2-(2-hydroxy-3-α-cumyl-5-tert-octylphenyl)-2H-benzotriazole;

(k) 5-octylsulfonyl-2-(2-hydroxy-3,5-di-α-cumylphenyl)-2H-benzotriazole;

(l) 5-dodecylsulfonyl-2-(2-hydroxy-3,5-di-tert-butylphenyl)-2H-benzotriazole;

(m) 5-octylsulfonyl-2-(2-hydroxy-3,5-di-tert-octylphenyl)-2H-benzotriazole;

(n) 5-trifluoromethyl-2-(2-hydroxy-3-α-cumyl-5-tert-butylphenyl)-2H-benzotriazole;

(o) 5-trifluoromethyl-2-(2-hydroxy-3-α-cumyl-5-nonylphenyl)-2H-benzotriazole;

(p) 5-trifluoromethyl-2-[2-hydroxy-3-α-cumyl-5-(2-hydroxyethyl)phenyl]-2H-benzotriazole;

(q) 5-trifluoromethyl-2-[2-hydroxy-3-α-cumyl-5-(3-hydroxypropyl)phenyl]-2H-benzotriazole;

(r) 5-trifluoromethyl-2-(2-hydroxy-3,5-di-tert-amylphenyl)-2H-benzotriazole;

(s) 5-trifluoromethyl-2-(2-hydroxy-3,5-di-tert-butylphenyl)-2H-benzotriazole;

(t) 5-trifluoromethyl-2-(2-hydroxy-3-dodecyl-5-methylphenyl)-2H-benzotriazole;

(u) 5-trifluoromethyl-2-[2-hydroxy-3-tert-butyl-5-(3-hydroxypropyl)phenyl]-2H-benzotriazole;

(v) 5-trifluoromethyl-2-[2-hydroxy-3-tert-butyl-5-(2-hydroxyethyl)phenyl]-2H-benzotriazole;

(w) 5-trifluoromethyl-2-[2-hydroxy-5-(2-hydroxyethyl)phenyl]-2H-benzotriazole;

(x) 5-trifluoromethyl-2-(2-hydroxy-3,5-di-α-cumylphenyl)-2H-benzotriazole;

(y) 5-fluoro-2-(2-hydroxy-3,5-di-α-cumylphenyl)-2H-benzotriazole;

(z) 5-butylsulfonyl-2-(2-hydroxy-3,5-di-α-cumylphenyl)-2H-benzotriazole;

(aa) 5-butylsulfonyl-2-(2-hydroxy-3,5-di-tert-butylphenyl)-2H-benzotriazole;

(bb) 5-butylsulfonyl-2-(2-hydroxy-3,5-di-tert-octylphenyl)-2H-benzotriazole;

(cc) 5-phenylsulfonyl-2-(2-hydroxy-3,5-di-tert-butylphenyl)-2H-benzotriazole; or (dd) 5-chloro-2-(2-hydroxy-3,5-di-α-cumylphenyl)-2H-benzotriazole.

13. A composition according to claim 12 wherein the benzotriazole of component (ii) is (a) 5-trifluoromethyl-2-(2-hydroxy-3-α-cumyl-5-tert-octylphenyl)-2H-benzotriazole;

(b) 5-trifluoromethyl-2-(2-hydroxy-5-tert-octylphenyl)-2H-benzotriazole;

(c) 5-trifluoromethyl-2-(2-hydroxy-3,5-di-tert-octylphenyl)-2H-benzotriazole;

(g) methyl 3-(5-trifluoromethyl-2H-benzotriazol-2-yl)-5-tert-butyl-4-hydroxyhydrocinnamate;

(j) 5-butylsulfonyl-2-(2-hydroxy-3-α-cumyl-5-tert-octylphenyl)-2H-benzotriazole;

(n) 5-trifluoromethyl-2-(2-hydroxy-3-α-cumyl-5-tert-butylphenyl)-2H-benzotriazole;

(s) 5-trifluoromethyl-2-(2-hydroxy-3,5-di-tert-butylphenyl)-2H-benzotriazole;

(x) 5-trifluoromethyl-2-(2-hydroxy-3,5-di-α-cumylphenyl)-2H-benzotriazole;

(aa) 5-butylsulfonyl-2-(2-hydroxy-3,5-di-tert-butylphenyl)-2H-benzotriazole; or (cc) 5-phenylsulfonyl-2-(2-hydroxy-3,5-di-tert-butylphenyl)-2H-benzotriazole.

14. A composition according to claim 1 wherein the the adhesive of component (a) is selected from the group consisting of the pressure sensitive adhesives, the rubber-based adhesives, the solvent or emulsion based adhesives, the hot melt adhesives and natural-product based adhesives.

15. A composition according to claim 1 wherein the adhesive composition is present in a laminated or multilayer construction.

16. A composition according to claim 15 wherein the laminated or multilayer construction is selected from the group consisting of (a) retroreflective sheets and signs and conformable marketing sheets;

(b) solar control films of various construction;

(c) corrosion resistant silver mirrors and solar reflectors;

(d) reflective print labels;

(e) UV absorbing glasses and glass coatings;

(f) electrochromic devices;

(g) films/glazings;

(h) windscreens and intermediate layers; and (i) optical films.

17. A composition according to claim 16 wherein the laminated or multilayer construction is selected from the group consisting of (a) retroreflective sheets and signs and conformable marketing sheets;

(b) solar control films of various construction;

(e) UV absorbing glasses and glass coatings;

(g) films/glazings; and (h) windscreens and intermediate layers.

18. A composition according to claim 17 wherein the laminated or multilayer construction is selected from the group consisting of (b) a solar control films of various construction; and (h) windscreens and intermediate layers.

19. A composition according to claim 1 wherein the adhesive of component (a) is a polyacrylate.

20. A composition according to claim 1 which additionally contains from 0.01 to 10% by weight based on the adhesive of a coadditive which is selected from the group consisting of the antioxidants, other UV absorbers, hindered amines, phosphites or phosphonites, hydroxylamines, nitrones, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents and blowing agents.

21. A composition according to claim 20 wherein the amount of coadditive is from 0.025 to 5% by weight based on the adhesive.

22. A composition according to claim 21 wherein the amount of coadditive is from 0.1 to 3% by weight based on the adhesive.

23. A composition according to claim 1 wherein the optional coadditives are selected from the group consisting of plasticizers, adhesion promoters, waxes, petroleum waxes, elastomers, tackifier resins, oils, resins, polymers, rosin, modified rosin or rosin derivatives, hydrocarbon resins, terpene resins, paraffin wax, microcrystalline wax, synthetic hard wax and/or polyethylene wax.

24. A composition according to claim 3 wherein the the adhesive of component (a) is selected from the group consisting of the pressure sensitive adhesives, the rubber-based adhesives, the solvent or emulsion based adhesives, the hot melt adhesives and natural-product based adhesives.

25. A composition according to claim 3 wherein the adhesive composition is present in a laminated or multilayer construction.

26. A composition according to claim 25 wherein the laminated or multilayer construction is selected from the group consisting of (a) retroreflective sheets and signs and conformable marketing sheets;

(b) solar control films of various construction;

(c) corrosion resistant silver mirrors and solar reflectors;

(d) reflective print labels;

(e) UV absorbing glasses and glass coatings;

(f) electrochromic devices;

(g) films/glazings;

(h) windscreens and intermediate layers; and (i) optical films.

27. A composition according to claim 26 wherein the laminated or multilayer construction is selected from the group consisting of
    (a) retroreflective sheets and signs and conformable marketing sheets;
    (b) solar control films of various construction;
    (e) UV absorbing glasses and glass coatings;
    (g) films/glazings; and
    (h) windscreens and intermediate layers.

28. A composition according to claim 27 wherein the laminated or multilayer construction is selected from the group consisting of
    (b) a solar control films of various construction; and
    (h) windscreens and intermediate layers.

29. A composition according to claim 3 wherein the adhesive of component (a) is a polyacrylate.

30. A composition according to claim 3 which additionally contains from 0.01 to 10% by weight based on the adhesive of a coadditive which is selected from the group consisting of the antioxidants, other UV absorbers, hindered amines, phosphites or phosphonites, hydroxylamines, nitrones, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents and blowing agents.

31. A composition according to claim 30 wherein the amount of coadditive is from 0.025 to 5% by weight based on the adhesive.

32. A composition according to claim 31 wherein the amount of coadditive is from 0.1 to 3% by weight based on the adhesive.

33. A composition according to claim 3 wherein the optional coadditives are selected from the group consisting of plasticizers, adhesion promoters, waxes, petroleum waxes, elastomers, tackifier resins, oils, resins, polymers, rosin, modified rosin or rosin derivatives, hydrocarbon resins, terpene resins, paraffin wax, microcrystalline wax, synthetic hard wax and/or polyethylene wax.

34. A composition according to claim 7 wherein the the adhesive of component (a) is selected from the group consisting of the pressure sensitive adhesives, the rubber-based adhesives, the solvent or emulsion based adhesives, the hot melt adhesives and natural-product based adhesives.

35. A composition according to claim 7 wherein the adhesive composition is present in a laminated or multilayer construction.

36. A composition according to claim 35 wherein the laminated or multilayer construction is selected from the group consisting of
    (a) retroreflective sheets and signs and conformable marketing sheets;
    (b) solar control films of various construction;
    (c) corrosion resistant silver mirrors and solar reflectors;
    (d) reflective print labels;
    (e) UV absorbing glasses and glass coatings;
    (f) electrochromic devices;
    (g) films/glazings;
    (h) windscreens and intermediate layers; and
    (i) optical films.

37. A composition according to claim 36 wherein the laminated or multilayer construction is selected from the group consisting of
    (a) retroreflective sheets and signs and conformable marketing sheets;
    (b) solar control films of various construction;
    (e) UV absorbing glasses and glass coatings;
    (g) films/glazings; and
    (h) windscreens and intermediate layers.

38. A composition according to claim 37 wherein the laminated or multilayer construction is selected from the group consisting of
    (b) a solar control films of various construction; and
    (h) windscreens and intermediate layers.

39. A composition according to claim 7 wherein the adhesive of component (a) is a polyacrylate.

40. A composition according to claim 7 which additionally contains from 0.01 to 10% by weight based on the adhesive of a coadditive which is selected from the group consisting of the antioxidants, other UV absorbers, hindered amines, phosphites or phosphonites, hydroxylamines, nitrones, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents and blowing agents.

41. A composition according to claim 40 wherein the amount of coadditive is from 0.025 to 5% by weight based on the adhesive.

42. A composition according to claim 41 wherein the amount of coadditive is from 0.1 to 3% by weight based on the adhesive.

43. A composition according to claim 7 wherein the optional coadditives are selected from the group consisting of plasticizers, adhesion promoters, waxes, petroleum waxes, elastomers, tackifier resins, oils, resins, polymers, rosin, modified rosin or rosin derivatives, hydrocarbon resins, terpene resins, paraffin wax, microcrystalline wax, synthetic hard wax and/or polyethylene wax.

44. A composition according to claim 1 wherein the adhesive of component (a) is poly(vinyl butyral).

45. A composition according to claim 3 wherein the adhesive of component (a) is poly(vinyl butyral).

46. A composition according to claim 7 wherein the adhesive of component (a) is poly(vinyl butyral).

* * * * *